(12) United States Patent
Takanashi

(10) Patent No.: US 12,008,682 B2
(45) Date of Patent: *Jun. 11, 2024

(54) INFORMATION PROCESSOR, INFORMATION PROCESSING METHOD, AND PROGRAM IMAGE TO DETERMINE A REGION OF AN OPERATION TARGET IN A MOVING IMAGE

(71) Applicant: Sony Group Corporation, Tokyo (JP)

(72) Inventor: Shogo Takanashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,398

(22) Filed: Mar. 15, 2022

(65) Prior Publication Data

US 2022/0207788 A1 Jun. 30, 2022

Related U.S. Application Data

(63) Continuation of application No. 16/772,470, filed as application No. PCT/JP2018/036568 on Sep. 28, 2018, now Pat. No. 11,321,880.

(30) Foreign Application Priority Data

Dec. 22, 2017 (JP) ................................. 2017-245779

(51) Int. Cl.
*G06T 11/00* (2006.01)
*G06F 3/0354* (2013.01)
(Continued)

(52) U.S. Cl.
CPC ............ *G06T 11/00* (2013.01); *G06F 3/0354* (2013.01); *G06F 3/0425* (2013.01); *G06F 3/04883* (2013.01); *G06V 40/28* (2022.01)

(58) Field of Classification Search
CPC ......... G06T 11/00; G06T 7/20; G06F 3/0354; G06F 3/0425; G06F 3/04883;
(Continued)

(56) References Cited

U.S. PATENT DOCUMENTS 6,535,639 B1  3/2003  Uchihachi et al.
7,647,555 B1  1/2010  Wilcox et al.
(Continued)

FOREIGN PATENT DOCUMENTS

CN     1975736 A    6/2007
CN   102999630 A    3/2013
(Continued)

OTHER PUBLICATIONS

Bested et al., "A social interactive whiteboard system using finger-tracking for mobile devices", Revised: Aug. 1, 2016 / Accepted: Aug. 30, 2016 /Published online: Sep. 14, 2016 © Springer Science + Business Media New York 2016 (Year: 2016).*

(Continued)

*Primary Examiner* — Maurice L. McDowell, Jr.
(74) *Attorney, Agent, or Firm* — Oblon, McClelland, Maier & Neustadt, L.L.P.

(57) ABSTRACT

A mechanism that makes it possible to efficiently specify an important region of a moving image including a dynamic content. An information processor including a control unit that recognizes a motion of an operator with respect to an operation target in a moving image and specifies an important region of the operation target in the moving image on a basis of an operation position of the operator.

20 Claims, 19 Drawing Sheets

(51) Int. Cl.
  *G06F 3/042*       (2006.01)
  *G06F 3/04883*     (2022.01)
  *G06V 40/20*       (2022.01)

(58) Field of Classification Search
  CPC ...... G06F 3/0304; G06F 16/783; G06F 3/017;
          G06F 3/048; G06V 40/28; G09B 5/02;
          G09B 19/00; H04N 5/91
  See application file for complete search history.

(56) References Cited

U.S. PATENT DOCUMENTS

| | | | |
|---|---|---|---|
| 11,321,880 B2* | 5/2022 | Takanashi | ............... H04N 5/91 |
| 2003/0210886 A1 | 11/2003 | Li | |
| 2005/0180730 A1 | 8/2005 | Huh | |
| 2007/0072164 A1* | 3/2007 | Katsuyama | ............ G09B 5/067 |
| | | | 434/353 |
| 2007/0120871 A1 | 5/2007 | Okamoto | |
| 2007/0269105 A1 | 11/2007 | Zhang et al. | |
| 2008/0192840 A1 | 8/2008 | Hua | |
| 2010/0011297 A1 | 1/2010 | Tsai et al. | |
| 2010/0104134 A1* | 4/2010 | Wang | ................... G06F 3/0304 |
| | | | 382/103 |
| 2012/0062736 A1 | 3/2012 | Xiong | |
| 2013/0151339 A1 | 6/2013 | Kim et al. | |
| 2013/0215292 A1 | 8/2013 | Reichelt | |
| 2013/0285909 A1 | 10/2013 | Patel et al. | |
| 2014/0101691 A1 | 4/2014 | Sinha et al. | |
| 2014/0232636 A1* | 8/2014 | Hara | ...................... G06V 40/28 |
| | | | 345/156 |
| 2014/0292653 A1 | 10/2014 | Kamba et al. | |
| 2014/0361988 A1 | 12/2014 | Katz et al. | |
| 2015/0373283 A1* | 12/2015 | Hayashi | ................ G06T 3/4038 |
| | | | 348/239 |
| 2018/0047428 A1* | 2/2018 | Suzuki | ................. G11B 27/031 |
| 2018/0176477 A1 | 6/2018 | Hoshino | |
| 2018/0278903 A1 | 9/2018 | Iwadate et al. | |
| 2018/0356894 A1* | 12/2018 | Aalbu | .................... G06V 40/28 |
| 2019/0189162 A1 | 6/2019 | Cunico et al. | |

FOREIGN PATENT DOCUMENTS

| | | | |
|---|---|---|---|
| JP | 2004-187043 A | | 7/2004 |
| JP | 2005234368 A | * | 9/2005 |
| JP | 2006-228059 A | | 8/2006 |
| JP | 2007134771 A | | 5/2007 |
| JP | 2007-148904 A | | 6/2007 |
| JP | 2009-245406 A | | 10/2009 |
| JP | 2012059271 A | | 3/2012 |
| JP | 2014-531662 A | | 11/2014 |
| KR | 20030032789 A | | 4/2003 |
| KR | 20160082291 A | | 7/2016 |

OTHER PUBLICATIONS

International Search Report issued Oct. 30, 2018 in PCT/JP2018/036568, 2 pages.

Shin Yamada et al., "Video Indexing and Index Editing Technology", Matsushita Technical Journal, Oct. 18, 1998, vol. 44, No. 5, pp. 125-132.

Hijung Valentina Shin et al: "Visual Transcripts", ACM Transactions On Graphics, vol. 34, No. 6, Oct. 26, 2015, pp. 1-10, XP058075371, ISSN: 0730-0301, DOI: 10.1145/2816795.2818123 ; & Hijung Shin : "Visual Transcripts: Lecture Notes from Blackboard-Style Lecture Videos", Nov. 25, 2015, XP055762815, Retrieved from the Internet: URL: https://www.youtube.com/watch?v=SfE_WCctWU4 [retrieved on Jan. 5, 2021].

Juho Kim et al: "Data-Driven Interaction Techniques for Improving Navigation of Educational Videos", User Interface Software And Technology, ACM, Oct. 5, 2014. pp. 563-572, XP058058546, DOI: 10.1145/2642918.2647389 ISBN: 978-1-4503-3069-5.

Takashi Kobayashi et al: "Presentation Scene Retrieval Exploiting Features in Videos Including Pointing and Speech Information", May 21, 2014, XP055762804, pp. 1-6 and cover page, Retrieved from the Internet: URL:https://www.researchgate.net/publication/228862240_Presentation_scene_retrieval_exploiting_features_in_videos_including_pointing_and-speech_information [retrieved on Jan. 5, 2021].

* cited by examiner

FIG. 1
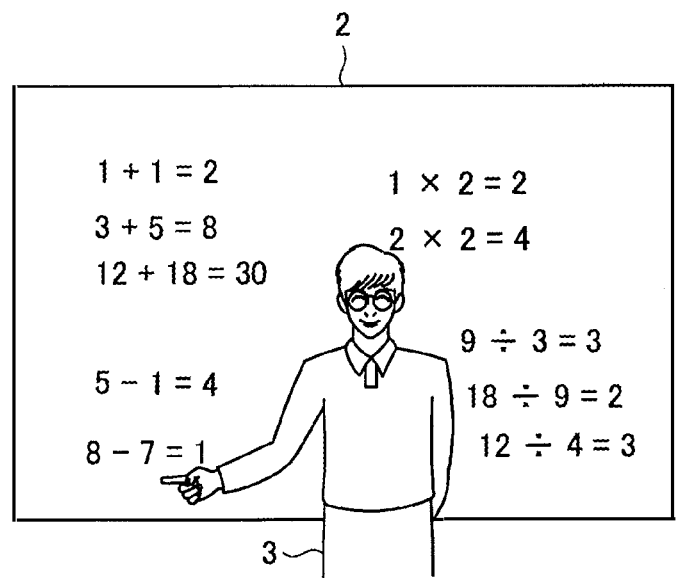
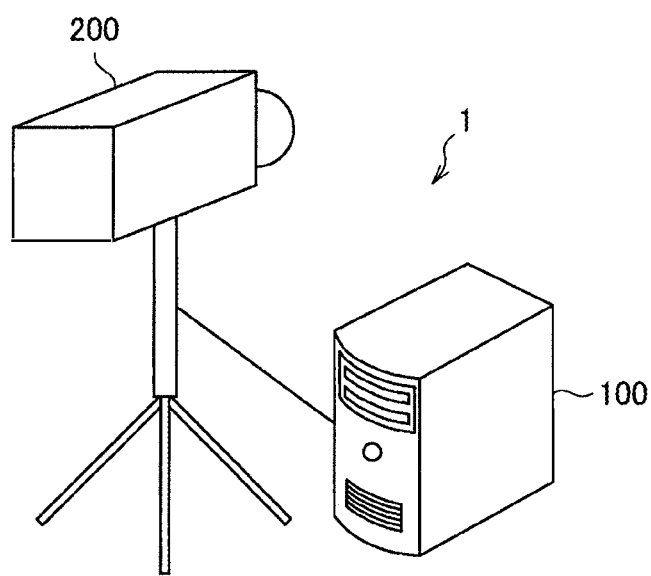

FIG. 5
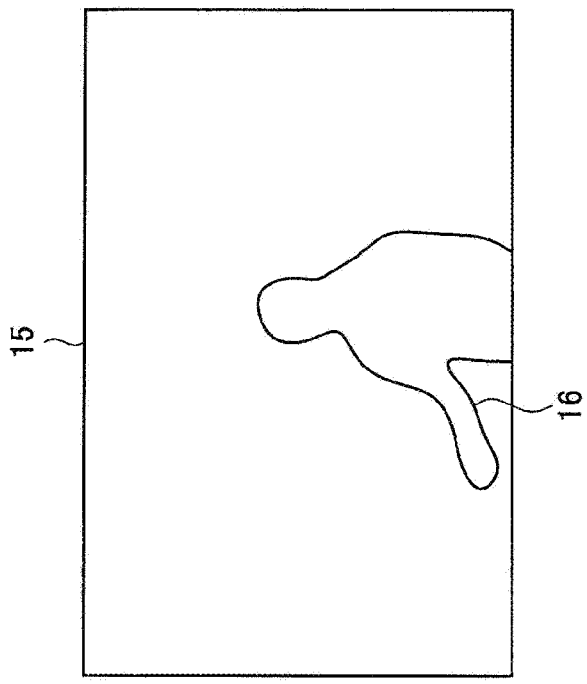
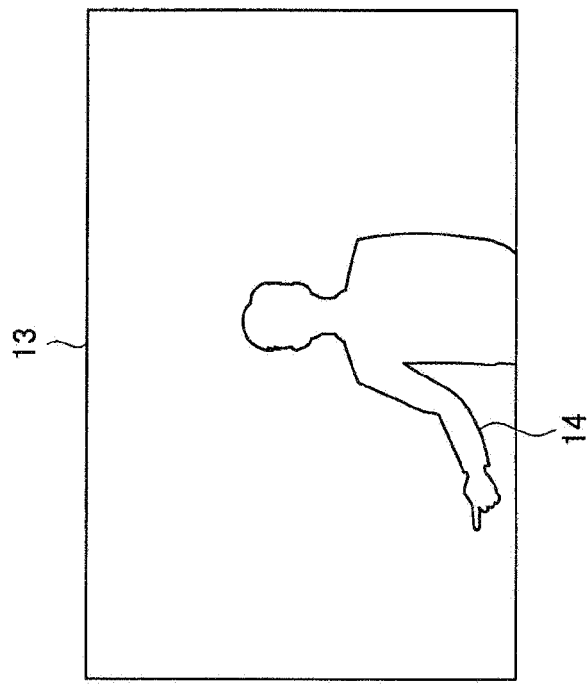

FIG. 8
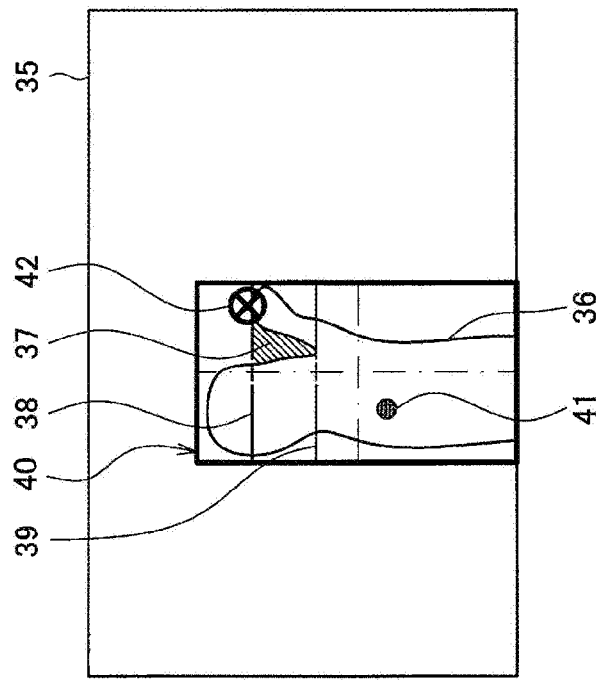
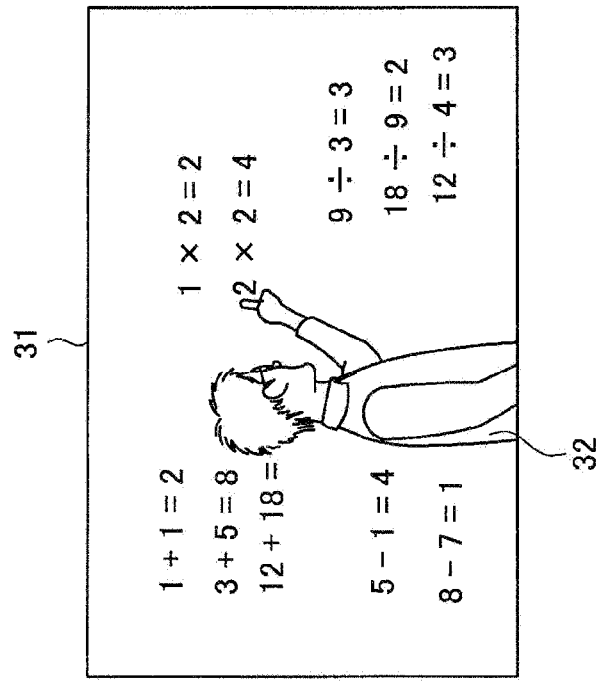

INFORMATION PROCESSOR, INFORMATION PROCESSING METHOD, AND PROGRAM IMAGE TO DETERMINE A REGION OF AN OPERATION TARGET IN A MOVING IMAGE

TECHNICAL FIELD

The present disclosure relates to an information processor, an information processing method, and a program.

BACKGROUND ART

In recent years, with the improvement in camera capabilities, the increase in capacity of storage media, and the like, shooting of a moving image has been widely performed. Meanwhile, it takes time to reproduce a moving image. In addition, it is difficult to know where to watch in a wide screen unless a moving image is viewed from the beginning. Accordingly, there has been a need for a technique that makes it possible to view a moving image efficiently.

For example, PTL 1 below discloses a technique of determining importance for each information included in a presentation material on the basis of a position pointed by a laser pointer in a video-recorded moving image for explaining the presentation material performed using the laser pointer.

CITATION LIST

Patent Literature

PTL 1: Japanese Unexamined Patent Application Publication No. 2006-228059

SUMMARY OF THE INVENTION

Problem to be Solved by the Invention

However, an application target of a technique described in PTL 1 described above is limited to a moving image including a presentation material. The presentation material is a static content of which one piece does not change or changes only in a limited manner. Accordingly, it can be said that the technique described in PTL 1 described above is difficult to be applied to a moving image including a dynamic content.

Accordingly, the present disclosure proposes a mechanism that makes it possible to efficiently specify an important region of a moving image including a dynamic content.

Means for Solving the Problem

According to the present disclosure, there is provided an information processor including a control unit that recognizes a motion of an operator with respect to an operation target in a moving image and specifies an important region of the operation target in the moving image on a basis of an operation position of the operator.

In addition, according to the present disclosure, there is provided an information processor including a control unit that controls a display of a superimposed image in which information is superimposed on a moving image, in which the information indicates an important region of an operation target in the moving image, in which the important region is specified on a basis of an operation position of an operator with respect to the operation target in the moving image.

In addition, according to the present disclosure, there is provided an information processing method, which is executed by a processor, including recognizing a motion of an operator with respect to an operation target in a moving image, and specifying an important region of the operation target in the moving image on a basis of an operation position of the operator.

In addition, according to the present disclosure, there is provided a program that causes a computer to function as a control unit that recognizes a motion of an operator with respect to an operation target in a moving image, and specifies an important region of the operation target in the moving image on a basis of an operation position of the operator.

Effect of the Invention

As described above, according to the present disclosure, there is provided a mechanism that makes it possible to efficiently specify an important region of a moving image including a dynamic content. It is to be noted that the above-mentioned effects are not necessarily limitative; in addition to or in place of the above effects, there may be achieved any of the effects described in the present specification or other effects that may be grasped from the present specification.

BRIEF DESCRIPTION OF THE DRAWINGS

FIG. 1 is an explanatory diagram of an overview of a system according to an embodiment of the present disclosure.

FIG. 5 is an explanatory diagram of an example of the pointed position detection processing according to the present embodiment.

FIG. 8 is an explanatory diagram of an example of the pointed position detection processing according to the present embodiment.

MODES FOR CARRYING OUT THE INVENTION

Figure 2:
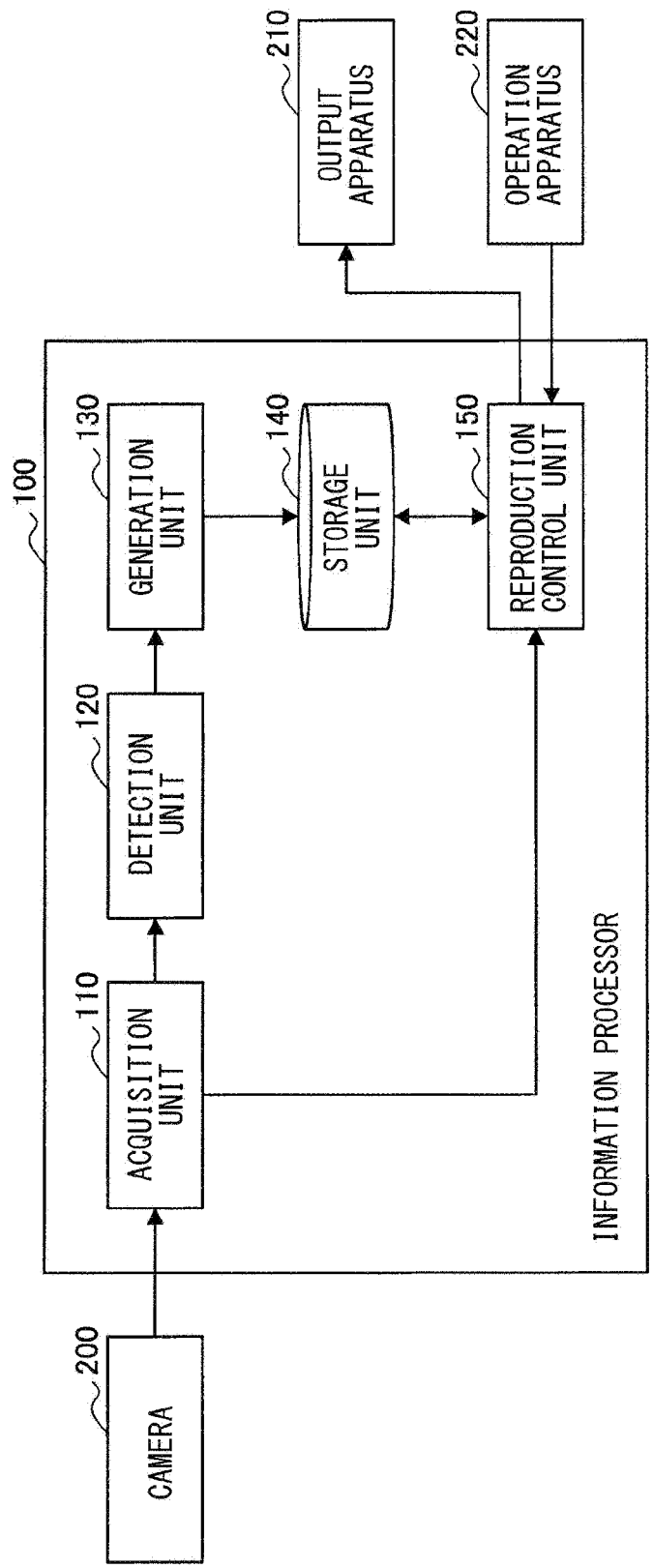
FIG. 2 is an explanatory diagram of an example of a configuration of the system according to the present embodiment.

Hereinafter, description is given in detail of preferred embodiments of the present disclosure with reference to the attached drawings. It is to be noted that, in the present specification and drawings, repeated description is omitted for components substantially having the same functional configuration by assigning the same reference numerals.

It is to be noted that description is given in the following order.
1. Introduction
2. Configuration Example
3. Technical Feature
　3.1. Pointed Position Detection Processing
　3.2. Importance Map Generation Processing
　3.3. Reproduction Control Processing
4. Hardware Configuration Example
5. Application Example
6. Conclusion 1. Introduction First, description is given of an overview of a system according to an embodiment of the present disclosure with reference to FIG. 1.

FIG. 1 is an explanatory diagram of an overview of a system according to an embodiment of the present disclosure. As illustrated in FIG. 1, a system 1 includes an information processor 100 and a camera 200 coupled to the information processor 100.

The camera 200 includes an imaging device and an audio input device. The imaging device includes a lens system configured by an imaging lens, an aperture, a zoom lens, and a focus lens, etc., a drive system that causes the lens system to perform a focus operation and a zoom operation, a solid-state imaging element array that performs photoelectric conversion of imaging light obtained by the lens system to generate an imaging signal, or other components. The audio input device includes a microphone that picks up ambient sounds, a microphone amplifier circuit that performs amplification processing of an audio signal obtained by the microphone, an A/D converter, and a signal processing circuit such as a noise canceller. The camera 200 outputs, as digital signals, image data and audio data upon imaging.

The camera 200 is able to capture, as an imaging target, a still image and a moving image of an object in a physical space. In the present embodiment, the camera 200 captures, as imaging targets, a moving image of an operation target 2 in a physical space and an operator 3 in the physical space. The moving image means data including a plurality of still images (image data) and reproduction times of the respective still images. When a moving image is reproduced, still images are reproduced continuously in the order of the reproduction times. The still images configuring the moving image are also referred to as frames. The displaying speed of the moving image is also referred to as a frame rate, and is represented by the number of frames displayed per second (FPS: Frame Per Second). The moving image may include audio data to be reproduced together with the reproduction of the image data. Hereinafter, as an example, the moving image is described as being a concept including image data and audio data.

The operation target 2 is an object that includes visual information such as a point, a line, a character, a sentence, a numerical expression, a symbol, a picture, or an image. In the present embodiment, the operation target 2 is a writing surface on which information (hereinafter, also referred to as writing information) is written. The writing surface is a blackboard, a whiteboard, an electronic paper, a touch panel, or the like, and the writing information is written on the writing surface by a chalk, a marker, a stylus, a finger, or the like. The operation target 2 is an example of a dynamic content. The dynamic content means an object or space that dynamically changes. Examples of the dynamic content include an operation target operated by an operator. Conversely, a static content means an object or space whose change is static or quasi-static. Examples of the static content include a display displaying a presentation material or a projection surface on which the presentation material is projected.

The operator 3 is a person who performs a motion with respect to the operation target 2. The operator 3 explains the operation target 2 while pointing each part of the operation target 2 with a hand or with an indicator, such as a laser pointer or a pointer held in the hand.

In the following, the operator 3 is described as being a lecturer who delivers a lecture using the operation target 2, and the operation target 2 is described as being a writing surface on which the writing information is written. In addition, the moving image captured by camera 200 is also referred to as a lecture moving image.

The camera 200 captures images of a writing surface (operation target 2) on which the writing information is written and an appearance of a lecturer (operator 3) who delivers a lecture while pointing the writing surface. The lecturer typically gives explanation while writing the writing information on the writing surface. Therefore, the lecture moving image can be said to be a moving image including a writing surface whose content changes dynamically, i.e., a dynamic content.

The information processor 100 specifies an important region of the operation target appearing in a lecture moving image on the basis of the lecture moving image captured by the camera 200. The information processor 100 generates a reproduction screen on the basis of the specified important region. The reproduction screen is viewed by a user (hereinafter, also referred to as a viewer). Accordingly, the viewer is able to recognize the important region on the writing surface that dynamically changes, on the basis of the specified important region without viewing the lecture moving image from the beginning, thus improving convenience. It is to be noted that examples of the viewer include a student who takes a lecture and a lecturer himself or herself, etc.

Further, the information processor 100 assigns a reproduction index to the lecture moving image on the basis of the specified important region, and generates a reproduction screen based on the reproduction index. The viewer is able to reproduce the lecture moving image while pointing a reproduction position of the lecture moving image on the reproduction screen using the reproduction index. This enables the viewer to efficiently view a scene in which an important explanation is considered to be given.

2. Configuration Example

FIG. 2 is an explanatory diagram of an example of a configuration of the system 1 according to the present embodiment. As illustrated in FIG. 2, the system 1 includes the information processor 100, the camera 200, an output apparatus 210, s and an operation apparatus 220.

As described above, the camera 200 captures images of the writing surface on which the writing information is written and the appearance of the lecturer who delivers the lecture while pointing the writing surface, and outputs the captured lecture moving image to the information processor 100.

The output apparatus 210 is an apparatus that outputs information by means of an image, a sound, and the like. The output apparatus 210 is implemented by a display apparatus such as a CRT display apparatus, a liquid crystal display apparatus, a plasma display apparatus, an EL display apparatus, a laser projector, an LED projector and a lamp, as well as by an audio output apparatus such as a speaker and a headphone. The output apparatus 210 outputs a lecture moving image and information related to the lecture moving image under the control of the information processor 100. Specifically, the output apparatus 210 outputs a reproduction screen described later.

The operation apparatus 220 is an apparatus that accepts an input of an operation by a viewer. The operation apparatus 220 is implemented by a mouse, a keyboard, a touch panel, a button, a microphone, a switch, a lever, a remote control apparatus, an externally coupled apparatus, or the like. The operation apparatus 220 accepts an operation by a viewer on the reproduction screen, and outputs operation information to the information processor 100. The operation apparatus 220 accepts an input of an operation such as selection or movement, etc. of a UI (User Interface) element displayed on the reproduction screen described later. At this time, a pointer displayed on the reproduction screen may be operated, or an operation specific to a touch panel, such as a touch operation, a tap operation, a flick operation, or a swipe operation may be performed. In addition, the operation apparatus 220 may include an imaging device to accept a gesture operation. In addition, the operation apparatus 220 may include an audio input device to accept an audio input. In addition, the operation apparatus 220 may be a remote control apparatus utilizing infrared rays or other radio waves, or an externally coupled apparatus such as a mobile phone or a PDA in response to an operation of the information processor 100; the operation apparatus 220 may accept operations from these external apparatuses. It is to be noted that the output apparatus 210 and the operation apparatus 220 may be integrally configured as a touch panel display. Further, the output apparatus 210 and the operation apparatus 220 may be configured as another information processor independent of the information processor 100, as a smartphone or a tablet terminal.

The information processor 100 is an apparatus that controls overall operations of the system 1. The information processor 100 is implemented by a PC (Personal Computer), a smartphone, a tablet terminal, or the like. As illustrated in FIG. 2, the information processor 100 includes an acquisition unit 110, a detection unit 120, a generation unit 130, a storage unit 140, and a reproduction control unit 150. These components can also be grasped as a control unit for controlling the operations of the entire system 1.

The acquisition unit 110 has a function of acquiring a lecture moving image captured by the camera 200. The detection unit 120 has a function of detecting a pointed position described later on the basis of the lecture moving image. The generation unit 130 has a function of generating an importance map described later on the basis of the pointed position detected by the detection unit 120. The storage unit 140 has a function of storing the importance map at each time of the lecture moving image, generated by the generation unit 130. The reproduction control unit 150 has functions of generating a reproduction screen on the basis of the importance map stored in the storage unit 140 and of outputting the reproduction screen. At this time, the storage unit 140 controls a displayed content on the reproduction screen on the basis of the operation information outputted from the operation apparatus 220.

Description is given in detail below of operation processing performed by the information processor 100.

3. Technical Feature

<3.1. Pointed Position Detection Processing>
(1) Feature

The detection unit 120 recognizes motions of the lecturer with respect to the writing surface in the lecture moving image, and detects an operation position of the lecturer. The operation position of the lecturer means a position operated by the lecturer on the writing surface, and more particularly, a position pointed by the lecturer. Particularly, the detection unit 120 detects, in the lecture moving image, where on the writing surface the lecturer points while delivering the lecture. The position pointed by the lecturer may be grasped as a position on the writing surface, or may be grasped as a position of the writing information written on the writing surface.

The position pointed by the lecturer is a position pointed by a hand tip (i.e., fingertip) of the lecturer or a pointer held by the lecturer. Particularly, the detection unit 120 may detect, as the position pointed by the lecturer, a position of the fingertip of the finger used by the lecturer when pointing, such as an index finger, or a position of the fingertip of the finger closest to or in contact with the writing surface. In addition, the detection unit 120 may detect, as the position pointed by the lecturer, an irradiation position of a laser irradiated from a laser pointer, a contact position of a tip of the pointer in a case of being in contact with the writing surface, or a position of an extension of the pointer on the writing surface in a case where the tip of the pointer is not in contact with the writing surface. The position pointed by the lecturer is hereinafter also referred to as the pointed position.

Various methods are conceivable for detecting the pointed position. The detection unit 120 recognizes an image of the hand tip of the lecturer or the pointer held by the lecturer on the basis of the lecture moving image to thereby detect a pointed position. For example, the detection unit 120 may extract a skeleton shape (e.g., position of a joint) from still images of respective frames configuring the lecture moving image to detect the pointed position on the basis of the extracted skeleton shape. In that case, the detection unit 120 estimates the positions of the respective joints in the lecture moving image, and detects, as the pointed position in the lecture moving image, a position shifted by an offset amount from the position of the joint closest to the hand tip to the hand tip. In addition, the detection unit 120 may extract a silhouette shape of the lecturer from the still images of the respective frames configuring the lecture moving image to detect the pointed position on the basis of the extracted silhouette shape.

Alternatively, in a case where depth information of the lecturer and the writing surface with respect to the camera 200 is obtained, the detection unit 120 may detect the pointed position on the basis of the depth information. In addition, in a case where the body of the lecturer (e.g., hand) is fitted with an inertial sensor (an acceleration sensor and an angular velocity sensor), the detection unit 120 may detect the pointed position on the basis of sensing results by the inertial sensor. In addition, in a case where a contact detection sensor, such as a pressure sensor or an infrared sensor, is provided on the writing surface, the detection unit 120 may detect the pointed position on the basis of sensing results by these sensors.

(2) Detection of Pointed Position Based on Silhouette Shape

Figure 3:
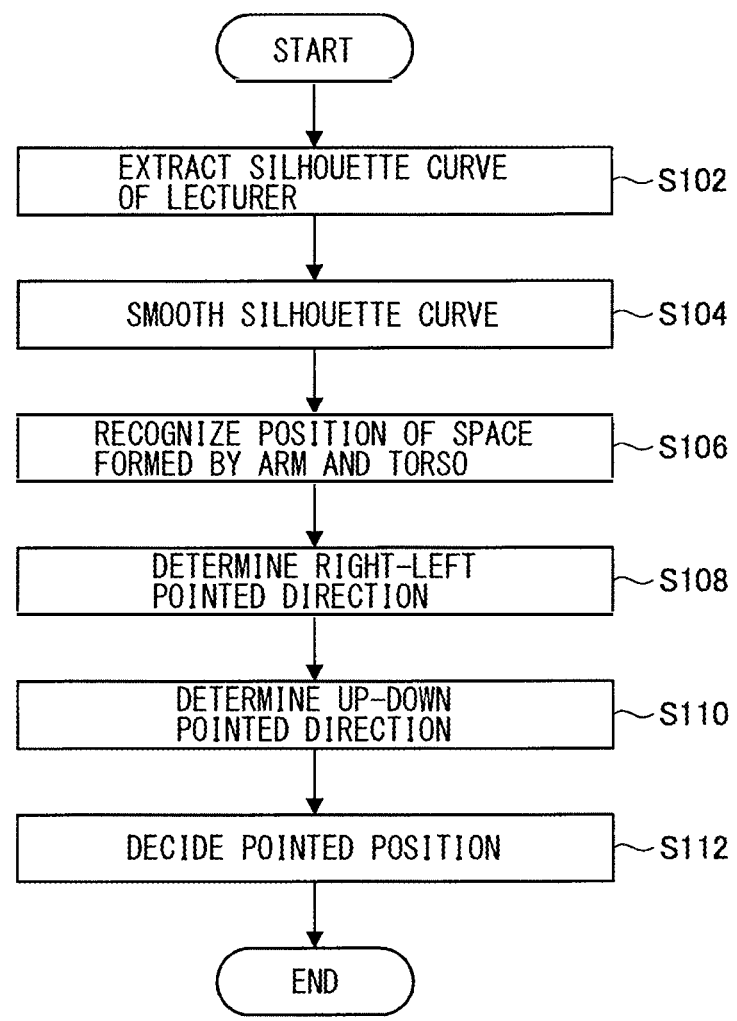
FIG. 3 is a flowchart illustrating an example of a flow of pointed position detection processing to be executed by an information processor according to the present embodiment.

Hereinafter, with reference to FIGS. 3 to 8, description is given in detail of processing in the case where the position pointed by the hand tip is detected on the basis of the silhouette shape. FIG. 3 is a flow chart illustrating an example of a flow of the pointed position detection processing to be executed by the information processor 100 according to the present embodiment. In addition, FIGS. 4 to 8 are each an explanatory diagram for describing an example of the pointed position detection processing according to the present embodiment.

Figure 4:
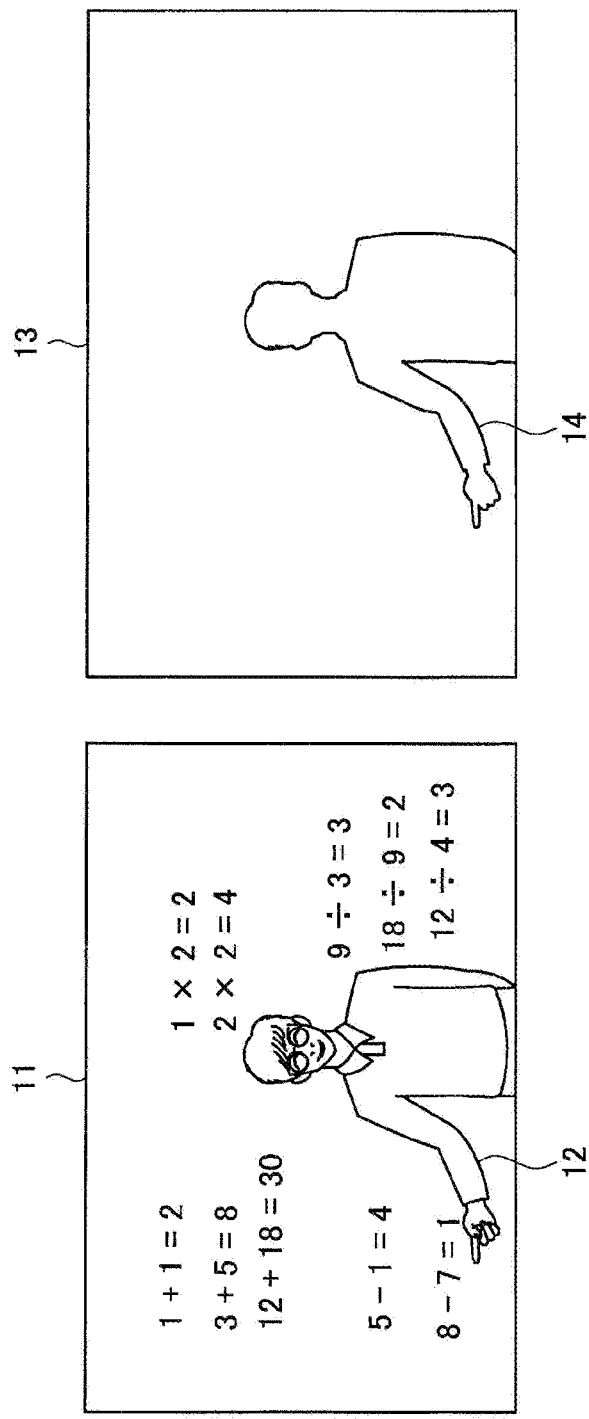
FIG. 4 is an explanatory diagram of an example of the pointed position detection processing according to the present embodiment.

As illustrated in FIG. 3, first, the detection unit 120 extracts a silhouette curve (in other words, a silhouette) of the lecturer (step S102). For example, the detection unit 120 extracts the silhouette of the lecturer using background differencing. The detection unit 120 calculates a difference in pixel values between a lecture moving image inputted from the camera 200 and a generated background moving image while internally generating the background moving image, and extracts, as foreground pixels, pixels where a difference equal to or more than a predetermined threshold value occurs. Then, the detection unit 120 extracts the foreground pixels as the silhouette of the lecturer. For example, as illustrated in FIG. 4, the detection unit 120 extracts foreground pixels 12 on the basis of the lecture moving image 11 to obtain a silhouette image 13 including a silhouette curve 14 that is a contour of the foreground pixels 12. A region surrounded by the silhouette curve 14 in the silhouette image 13 is a region corresponding to the lecturer in the lecture moving image 11.

The detection unit 120 then smoothes the silhouette curve (step S104). Particularly, the detection unit 120 applies filter processing to the silhouette curve to eliminate fine unevenness of the silhouette curve, thereby making the silhouette curve gentle. For example, as illustrated in FIG. 5, the detection unit 120 smoothes the silhouette curve 14 included in the silhouette image 13 to obtain a silhouette image 15 including a smoothed silhouette curve 16.

Figure 6:
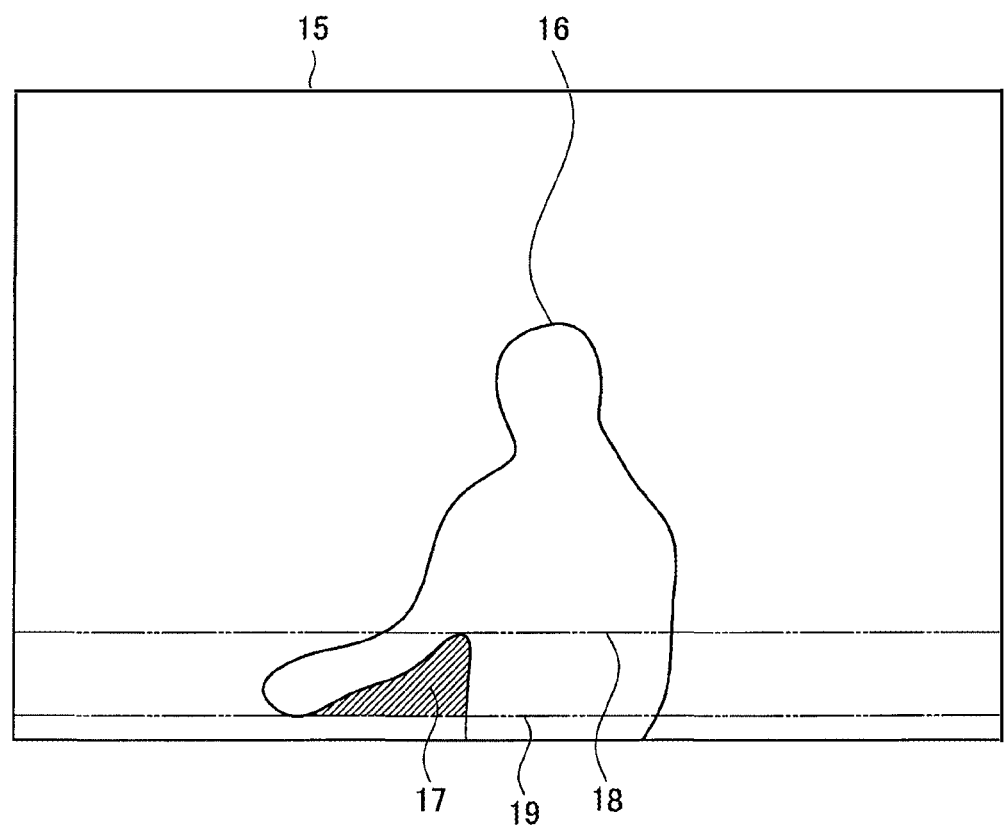
FIG. 6 is an explanatory diagram of an example of the pointed position detection processing according to the present embodiment.

Next, the detection unit 120 recognizes a position of a space formed by an arm and a torso of the lecturer (step S106). For example, as illustrated in FIG. 6, the detection unit 120 recognizes a space 17 formed by a part corresponding to the arm and a part corresponding to the torso out of the silhouette curve 16 included in the silhouette image 15 as well as an upper end horizontal line 18 and a lower end horizontal line 19 of the space 17.

Figure 7:
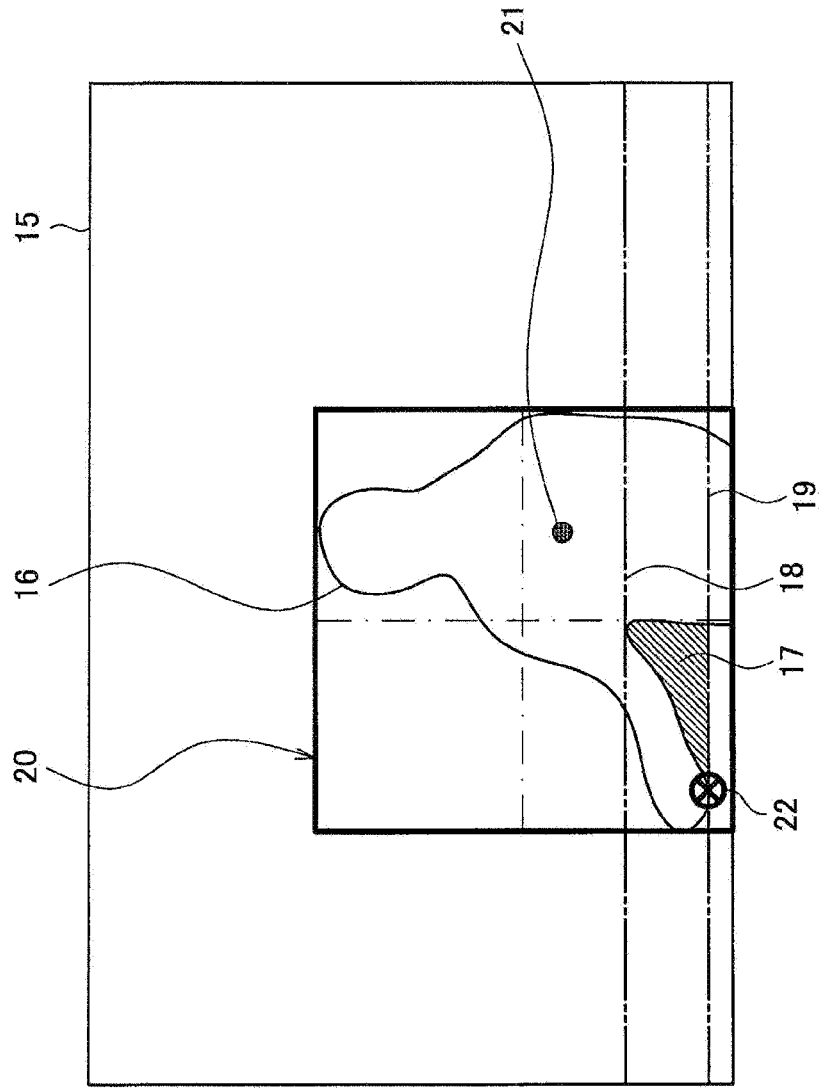
FIG. 7 is an explanatory diagram of an example of the pointed position detection processing according to the present embodiment.

The detection unit 120 then determines a right-left pointed direction (step S108). For example, as illustrated in FIG. 7, the detection unit 120 assumes a rectangle 20 inscribing the silhouette curve 16 included in the silhouette image 15. Then, the detection unit 120 determines whether a position of a gravity center 21 of a region surrounded by the silhouette curve 16 is located rightward or leftward with respect to the rectangle 20, thereby estimating whether the position of the hand tip is on the right or the left with respect to the body of the lecturer. Typically, it is often the case that the hand tip is located on side opposite to the gravity center. Accordingly, the detection unit 120 determines that the hand tip is on left side in a case where the position of the gravity center 21 of the region surrounded by the silhouette curve 16 is located rightward with respect to the rectangle 20, whereas, in the opposite case, the hand tip is determined to be on right side. In the example illustrated in FIG. 7, the position of the gravity center 21 of the region surrounded by the silhouette curve 16 is located rightward with respect to the rectangle 20, the hand tip is determined to be on the left side.

Next, the detection unit 120 determines an up-down pointed direction (step S110). For example, as illustrated in FIG. 7, the detection unit 120 determines whether the position of the space 17 is located upward or downward with respect to the rectangle 20 to thereby estimate whether the position of the hand tip is on upper side or on lower side with respect to the body of the lecturer. Particularly, the detection unit 120 determines that the position of the hand tip is on the upper side in a case where the position of the space 17 is located upward with respect to the rectangle 20, whereas, in the opposite case, the position of the hand tip is determined to be on the lower side. In the example illustrated in FIG. 7, the position of the space 17 is located downward with respect to the rectangle 20, and thus the hand tip is determined to be on the lower side.

Then, the detection unit 120 decides the pointed position (step S112). The detection unit 120 decides the pointed position on the basis of the determination results in the steps S108 and S110 described above. Particularly, the detection unit 120 sets, as a vertical position of the hand tip, a horizontal line on side where the hand tip is determined to be positioned, out of the upper end horizontal line 18 and the lower end horizontal line 19. In addition, the detection unit 120 sets, as a horizontal position of the hand tip, a horizontal line on side where the hand tip is determined to be positioned, out of the left end or the right end of a section, in contact with the space 17, of the horizontal line on the side where the hand is determined to be positioned. In the example illustrated in FIG. 7, the hand tip is determined to be on the lower side and on the left side, and thus the detection unit 120 determines, as the hand tip position, a left end 22 of the section of the lower end horizontal line 19 in contact with the space 17.

The description has been given above of an example of the flow of the pointed position detection processing.

Description is given, with reference to FIG. 8, of an example of a case where the pointed position detection processing described above is applied to another lecturer image. As illustrated in FIG. 8, it is assumed that a lecture moving image 31 is inputted to the information processor 100. Then, the detection unit 120 extracts foreground pixels 32 on the basis of the lecture moving image 31, extracts a silhouette curve that is a contour of the foreground pixels 32, and smoothes the silhouette curve to obtain a silhouette image 35 including a smoothed silhouette curve 36. Then, as illustrated in FIG. 8, the detection unit 120 recognizes a space 37 formed by a part corresponding to an arm and a part corresponding to a torso of the silhouette curve 36 included in the silhouette image 35 as well as an upper end horizontal line 38 and a lower end horizontal line 39 of the space 37. Then, the detection unit 120 assumes a rectangle 40 in which the silhouette curve 36 included in the silhouette image 35 is inscribed. Next, a position of a gravity center 41 of a region surrounded by the silhouette curve 36 is located leftward with respect to the rectangle 40, and thus the detection unit 120 determines that the hand tip is on the right side. In addition, the position of the space 37 is located upward with respect to the rectangle 40, and thus the detection unit 120 determines that the hand tip is on the upper side. Then, it is determined that the hand tip is on the upper side and on the right side, the detection unit 120 determines, as the hand tip position, a right end 42 of the section of the upper end horizontal line 38 in contact with the space 37.

It is to be noted that, in the pointed position detection processing based on the silhouette shape described above, it is not necessarily the case that only the hand tip pointing the writing information near the writing surface is detected. For example, when the lecturer simply spreads his or her hand, a tip of the hand may be detected. However, even when the hand tip position in such a behavior is detected, the information processor 100 is able to appropriately specify an important region by calculating an accumulated value of the hand tip position described later.

<3.2. Importance Map Generation Processing>
(1) Feature

The generation unit 130 specifies the important region of the writing surface on which the writing information is written in the lecture moving image, on the basis of the position pointed by the lecturer in the lecture moving image. The generation unit 130 specifies the important region on the basis of the positions pointed by the lecturer in respective still images configuring the lecture moving image. A typical lecturer is considered to explain while pointing an important region of the writing surface on which the writing information is written. In this respect, the important region is specified on the basis of the pointed position, thus making it possible to appropriately specify the important region of the writing surface.

The generation unit 130 calculates an accumulated value of a time in which the pointed position remains (i.e., time in which the lecturer is pointing) for each region of the writing surface on which the writing information appearing in the lecture moving image is written, and specifies a region having a large accumulated value as the important region. The generation unit 130 generates a map in which the pointed positions detected by the detection unit 120 are accumulated in a temporal direction for each region of the writing surface appearing in the lecture moving image. Such a map is also grasped as a cumulative presence map in which presence time of the pointed position is accumulated. The cumulative presence map is, for example, a two-dimensional histogram in which one region is one bin. Then, the generation unit 130 specifies a region having a large accumulated value (i.e., a length of time in which the hand tip is present) as the important region. Throughout the lecture, the accumulated value of a region pointed by the lecturer for a long period of time (in other words, frequently pointed) using a hand becomes high, whereas the accumulated value of any other region becomes low. Thus, the generation unit 130 is able to specify, as the important region, a region frequently pointed by the lecturer using a hand throughout the lecture. In addition, as described above, in the pointed position detection processing, even when the lecturer simply spreads his or her hand, a tip of the hand may be detected. In this respect, the important region is specified on the basis of the accumulated value, thus making it possible not to specify, as the important region, such a position of the hand tip that does not point the important part.

It is to be noted that accumulated value can be grasped as importance. That is, it can be said that, the higher the accumulated value of time is in which the lecturer points a certain region, the higher the importance of the region is.

The above region for which the accumulated value is calculated may be a pixel. That is, the generation unit 130 accumulates the pointed positions for respective pixels in the temporal direction, generates a two-dimensional histogram in which one pixel is one bin, and specifies a pixel having a large accumulated value as the important region. The generation unit 130 may calculate the accumulated value on a pixel-by-pixel basis to smooth accumulated values between the pixels. This allows the difference in the accumulated values between pixels to be smoothed. In this case, the generation unit 130 specifies, as the important region, a region including a plurality of pixels in one group whose smoothed accumulated value is greater than that of the surrounding.

The generation unit 130 decreases (i.e., degrades) the accumulated value in accordance with elapse of time. The generation unit 130 increases the accumulated value of the region pointed by the lecturer, while decreasing the accumulated value of a region not pointed by the lecturer. That is, even in a region where the accumulated value rises once, in a case where the pointed position is not detected in this region thereafter, the accumulated value decreases. Accordingly, as density at which the pointing is performed in the temporal direction becomes higher, the accumulated value of each region becomes higher. For example, the accumulated value of a region pointed by the lecturer in a time-intensive manner becomes high. Accordingly, the generation unit 130 is able not only to specify a important region in the respective still images configuring the lecture moving image, but also to specify a timing at which the important region is intensively pointed and explained.

The generation unit 130 starts decreasing the accumulated value in a case where a predetermined change occurs on the writing surface on which the writing information appearing in the lecture moving image is written. The predetermined change means, for example, rewritten or erased, etc. Decreasing the accumulated value in a case of occurrence of such a change prevents a region including rewritten writing information or a region that is erased with nothing being written from being erroneously specified as an important region.

The generation unit 130 generates a superimposed image in which information indicating the important region are superimposed on the lecture moving image. Particularly, the generation unit 130 calculates the accumulated values in the respective still images configuring the lecture moving image, and specifies the important region. Then, the generation unit 130 superimposes the information indicating the important region corresponding to each still image to generate the superimposed image. The region of the writing surface corresponding to the important region in the superimposed image is the region frequently pointed by the lecturer; thus it can be said that the region (the writing information written in the region) is important. Accordingly, the superimposed image makes it easier to recognize the important part of the writing information written on the writing surface. It is to be noted that the information indicating the important region in the superimposed image includes information indicating high and low level of the accumulated value for each region (e.g., pixel) included in the important region. The superimposed image generated in this manner is also hereinafter referred to as the importance map.

Here, it is assumed that the camera 200 is fixedly installed. The position and posture of the camera are fixed, and thus the relationship between the position pointed by the lecturer in the lecture moving image and the position on the writing surface actually pointed by the lecturer is unchanged. Accordingly, the generation unit 130 is able to specify an important region by accumulating the pointed positions on a pixel-by-pixel basis in the lecture moving image. Suppose that the camera 200 is installed position-changeably and posture-changeably, the relationship may be changed between the position pointed by the lecturer in the lecture moving image and the position on the writing surface actually pointed by the lecturer. In that case, on the basis of the position and posture of the camera 200, the generation unit 130 calculates the accumulated value of the pointed position while converting the position pointed by the lecturer in the lecture moving image to the position on the writing surface actually pointed by the lecturer.

(2) Specific Processing

Figure 9:
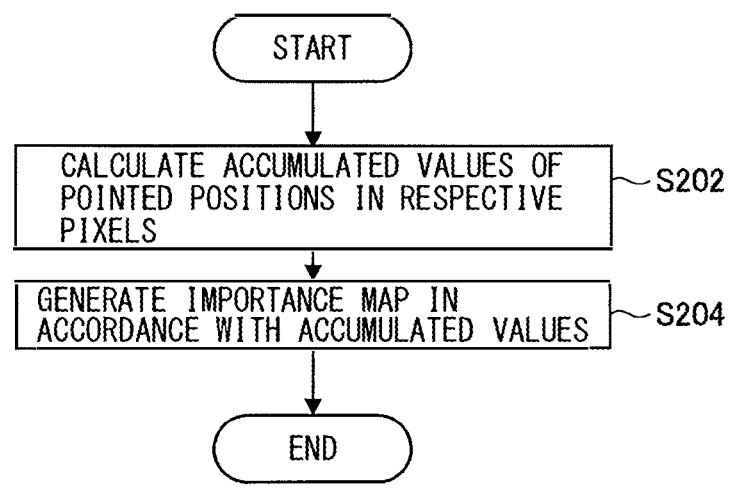
FIG. 9 is a flowchart illustrating an example of a flow of generation processing of an importance map to be executed by the information processor according to the present embodiment.
Figure 10:
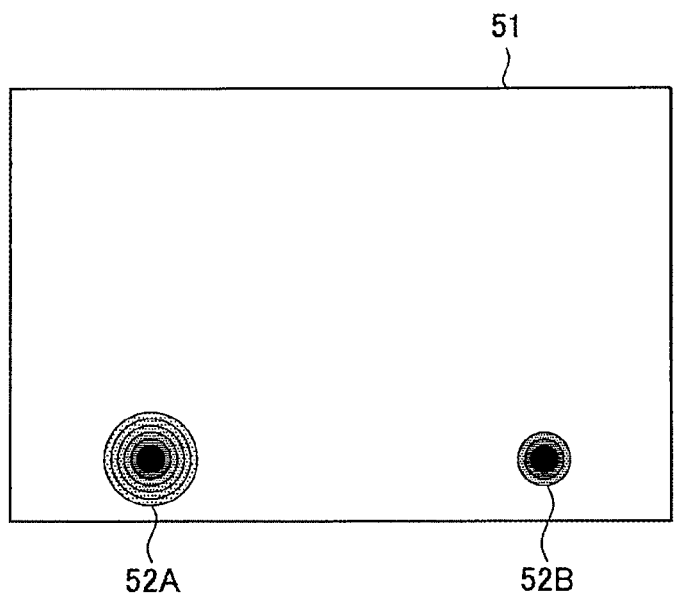
FIG. 10 is an explanatory diagram of an example of the generation processing of the importance map according to the present embodiment.
Figure 11:
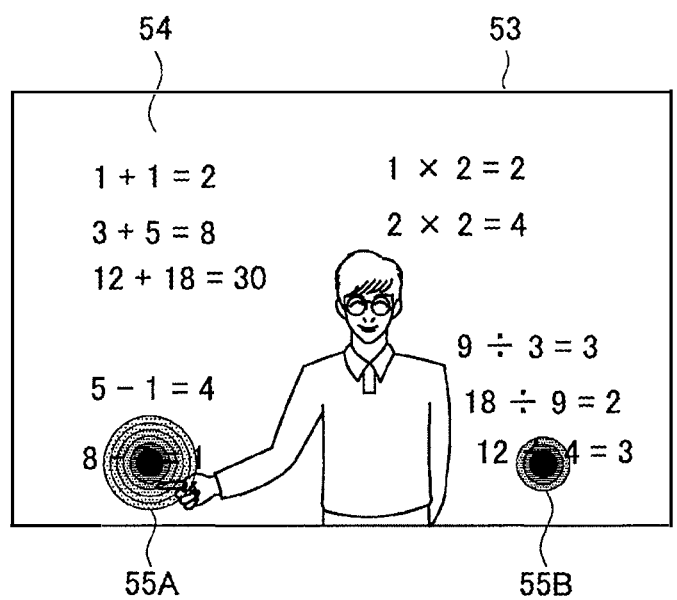
FIG. 11 is an explanatory diagram of an example of the generation processing of the importance map according to the present embodiment.

Hereinafter, with reference to FIGS. 9 to 11, description is given in detail of importance map generation processing. FIG. 9 is a flow chart illustrating an example of a flow of the importance map generation processing to be executed by the information processor 100 according to the present embodiment. In addition, FIGS. 10 and 11 are each an explanatory diagram for describing an example of the importance map generation processing according to the present embodiment.

As illustrated in FIG. 9, first, the generation unit 130 calculates accumulated values of pointed positions in respective pixels (step S202). Particularly, the generation unit 130 accumulates pointed positions detected by the detection unit 120 in the temporal direction for the respective pixels of the writing surface appearing in respective still images configuring the lecture moving image, and generates a two-dimensional histogram in which one pixel is one bin. The generation unit 130 then smoothes the accumulated values between the pixels in the two-dimensional histogram.

Then, the generation unit 130 generates the importance map in accordance with the accumulated values (step S204). Particularly, first, the generation unit 130 specifies, as an important region, a region including a plurality of pixels in one group whose accumulated value is greater than that of the surrounding in the two-dimensional histogram generated in step S202 described above. For example, as illustrated in FIG. 10, the generation unit 130 specifies, as important regions, regions 52A and 52B each including the plurality of pixels in one group whose smoothed accumulated value is greater than that of the surrounding in a two-dimensional histogram 51. It is to be noted that, in the example illustrated in FIG. 10, the darker the region is, the larger the accumulated value is. Then, the generation unit 130 superimposes information indicating the specified important region on the lecture moving image inputted in step S202 to thereby generate the importance map. For example, as illustrated in FIG. 11, the generation unit 130 superimposes information 55A and 52B each indicating the important regions on a lecture moving image 54 to thereby generate an importance map 53.

The importance map 53 may include information indicating information indicating importance of the important region. The importance of the important region means accumulated values of pointed positions of respective regions (respective pixels) included in the important region. The importance of the important region may be any statistic, such as a mean value, a maximum value, or a sum of the accumulated values of pointed positions of the respective regions included in the important region. The importance map 53 may include a numerical value itself of the importance as the information indicating the importance of the important region. In addition, the importance of the important region may be indicated by a color, a size, a shape, or the like of the information indicating the important region. For example, in the example illustrated in FIG. 11, an expression is made such that the color of a circle in the middle of information 55 indicating the important region is dark, while the color is gradually lighter as close to the periphery; this darkness of the color is information indicating the importance. The darker the color is, the higher the importance is, whereas the lighter the color is, the lower the importance is. In addition, in the example illustrated in FIG. 11, the size of the circle of the information 55 indicating the important region may indicate the importance. For example, the larger the circle is, the higher the importance is, whereas the smaller the circle is, the lower the importance is.

<3.3. Reproduction Control Processing>

(1) Index Assignment

The reproduction control unit 150 assigns a reproduction index to the lecture moving image in accordance with the importance of the important region in the importance map. The reproduction index is information used as a reference for a reproduction position (time at which reproduction is started) when the lecture moving image is reproduced. When a reproduction index is selected by a viewer, the reproduction control unit 150 reproduces the lecture moving image from a reproduction position corresponding to the selected reproduction index. Assigning the reproduction index improves the convenience of the viewer.

The reproduction control unit 150 assigns the reproduction index at a timing that satisfies a predetermined condition between the start and the end of the accumulation of respective importances of one or more important regions included in the lecture moving image. The timing at which the accumulation of the importances is started is a timing at which the importance is not zero, whereas the timing at which the accumulation of the importances is ended is a timing at which the importance is zero. For example, the reproduction control unit 150 assigns the reproduction index at each time when the importance of each of the one or more important regions included in the lecture moving image reaches a peak. When focusing on a certain important region, importance of this important region becomes larger as the accumulated value of the pointed position becomes larger, i.e., as the time in which the lecturer is pointing becomes longer; meanwhile, the importance of the important region decreases in accordance with elapse of time when the lecturer does not point any more. Accordingly, the importance of the important region reaches a peak at a high-density timing at which the important region is pointed by the lecturer in the temporal direction, i.e., at a timing at which the important region is intensively pointed and explained. Accordingly, by assigning the reproduction index at each time when the importance of each of the important regions reaches a peak, it is possible to assign the reproduction index at the timing at which each of the important regions is intensively pointed and explained. In addition, in a case where the importance of the important region continues to exceed a predetermined threshold value, the reproduction control unit 150 may assign the reproduction index to at least one of the first timing or the last timing exceeding the predetermined threshold value. In that case, it is possible to assign the reproduction index to at least one of a timing at which each of the important regions is started to be intensively pointed and explained or a timing at which the explanation is ended.

(2) Reproduction Screen

The reproduction control unit 150 generates a reproduction screen. A viewer is able to reproduce and view the lecture moving image on the reproduction screen.

The reproduction control unit 150 generates the reproduction screen including a first region for controlling the reproduction position on the basis of the importance map. In the first region, for example, the importance map is displayed at the time when the reproduction index is assigned. The first region is a region that accepts selection of the importance map by the viewer, i.e., selection of the reproduction index. The first region may include a plurality of importance maps.

In a case where an importance map included in the first region is selected by the viewer, the reproduction control unit 150 reproduces the lecture moving image from a reproduction position corresponding to the selected importance map. The reproduction position corresponding to the selected importance map (i.e., reproduction index) means, for example, the same time as the time when the reproduction index is assigned. In that case, the selection of the importance map enables the viewer to view the lecture moving image from the timing at which the important region in the importance map is intensively explained.

The reproduction position corresponding to the selected importance map may be different from that of the time when the reproduction index is assigned. In particular, it is desirable that the reproduction control unit 150 set, as the reproduction position, time which is predetermined time prior to the time of the selected importance map. This prevents reproduction from being started from the middle of intensive explanation by the lecturer, thus enabling the viewer to view the intensive explanation by the lecturer from the beginning.

For example, in a case where the importance map included in the first region is selected by the viewer, the reproduction control unit 150 may reproduce the lecture moving image from a reproduction position according to a temporal change in the important region included in the selected importance map. The reproduction position according to the temporal change in the important region included in the selected importance map means time immediately before the writing information is written on the writing surface corresponding to the important region, time in the middle of the writing, or time of completion of the writing. This enables the viewer to view the lecture moving image immediately before the writing of the writing information intensively explained by the lecturer, from the middle of the writing, or from the completion of the writing. Considering that there are lecturers who explain while writing the writing information and lecturers who explain after ending writing of the writing information, such a control of the reproduction position further improves convenience of the viewer.

The reproduction screen may include any region in addition to or in place of the first region described above. For example, the reproduction screen may include a second region in which the lecture moving image is reproduced, and a third region in which the importance map of the time corresponding to the reproduction position of the lecture moving image is displayed. This enables the viewer to view the lecture moving image while grasping the important region in the lecture moving image being reproduced.

Hereinafter, description is given of an example of the reproduction screen with reference to FIGS. 12 and 13.

Figure 12:
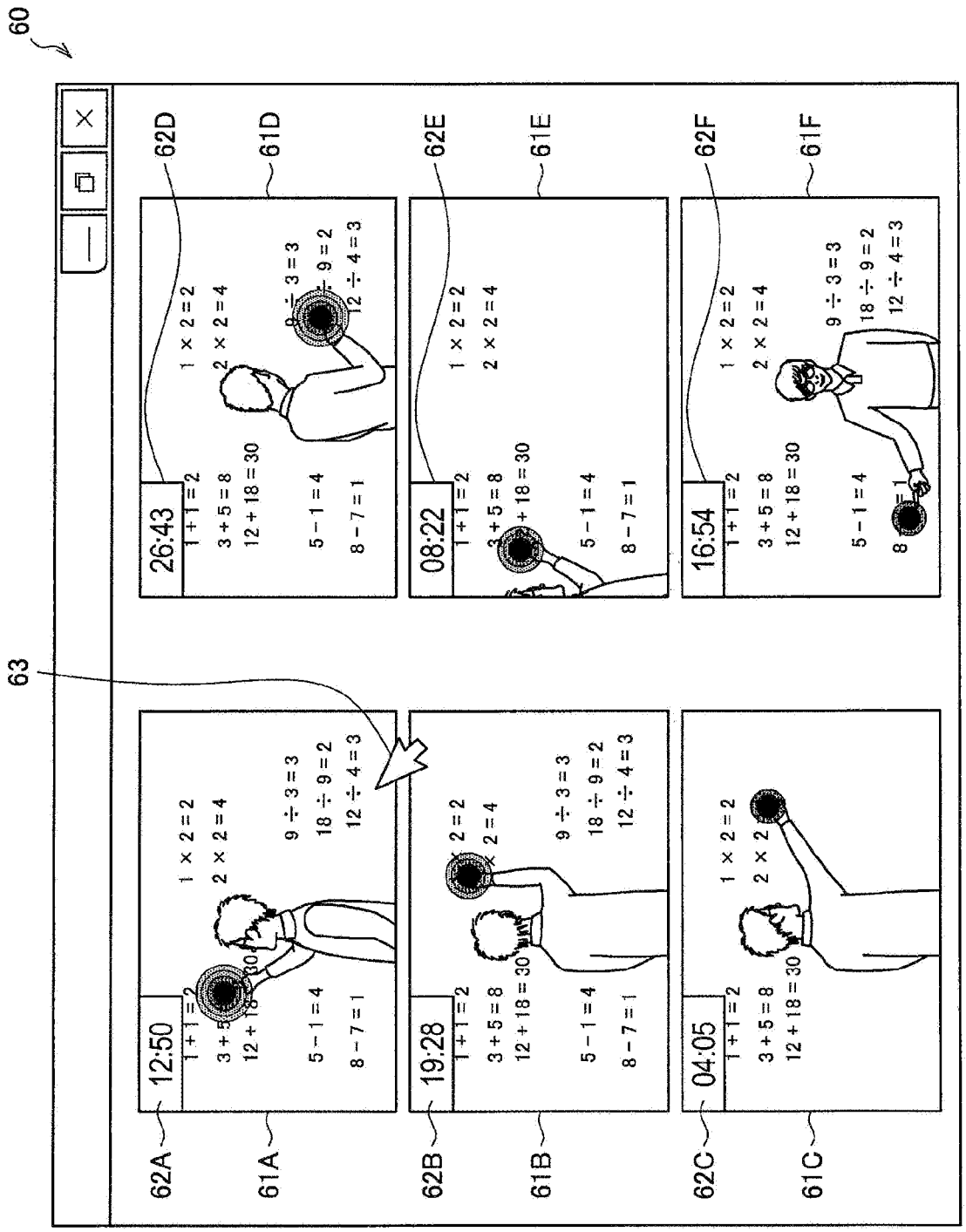
FIG. 12 illustrates an example of a reproduction screen of a lecture moving image according to the present embodiment.

FIG. 12 illustrates an example of the reproduction screen of the lecture moving image according to the present embodiment. A reproduction screen 60 illustrated in FIG. 12 includes only the first region. Particularly, the reproduction screen 60 includes importance maps 61 (61A to 61F) at times when the reproduction indexes are attached. In addition, the respective importance maps 61 are associated with time displays 62 (62A to 62F) which indicate times of the importance maps 61 (i.e., times at which the reproduction indexes are assigned). Selection of any importance map 61 by the operation of a pointer 63 enables the viewer to reproduce the lecture moving image from a reproduction position corresponding to the selected importance map 61. It is to be noted that, in addition to the operation of the pointers 63, the importance map 61 may be selected by an operation specific to a touch panel such as a touch operation, a gesture operation, an audio input, an operation from an external device, or the like. For example, when the importance map 61A is selected by the viewer, the reproduction control unit 150 reproduces the lecture moving image from the position of 12 minutes and 50 seconds. At that time, a reproduction window may be generated separately for reproducing the lecture moving image. Here, on the reproduction screen 60, the importance maps 61 are sorted in a descending order of importance, in which the importance map 61 located upper of the reproduction screen 60 has higher importance, whereas the importance map 61 located lower has lower importance. Accordingly, viewing the lecture moving image while selecting the importance map 61 from the upper to the lower of the reproduction screen 60 enables the viewer to efficiently view a scene in which an important explanation is considered to be given.

Figure 13:
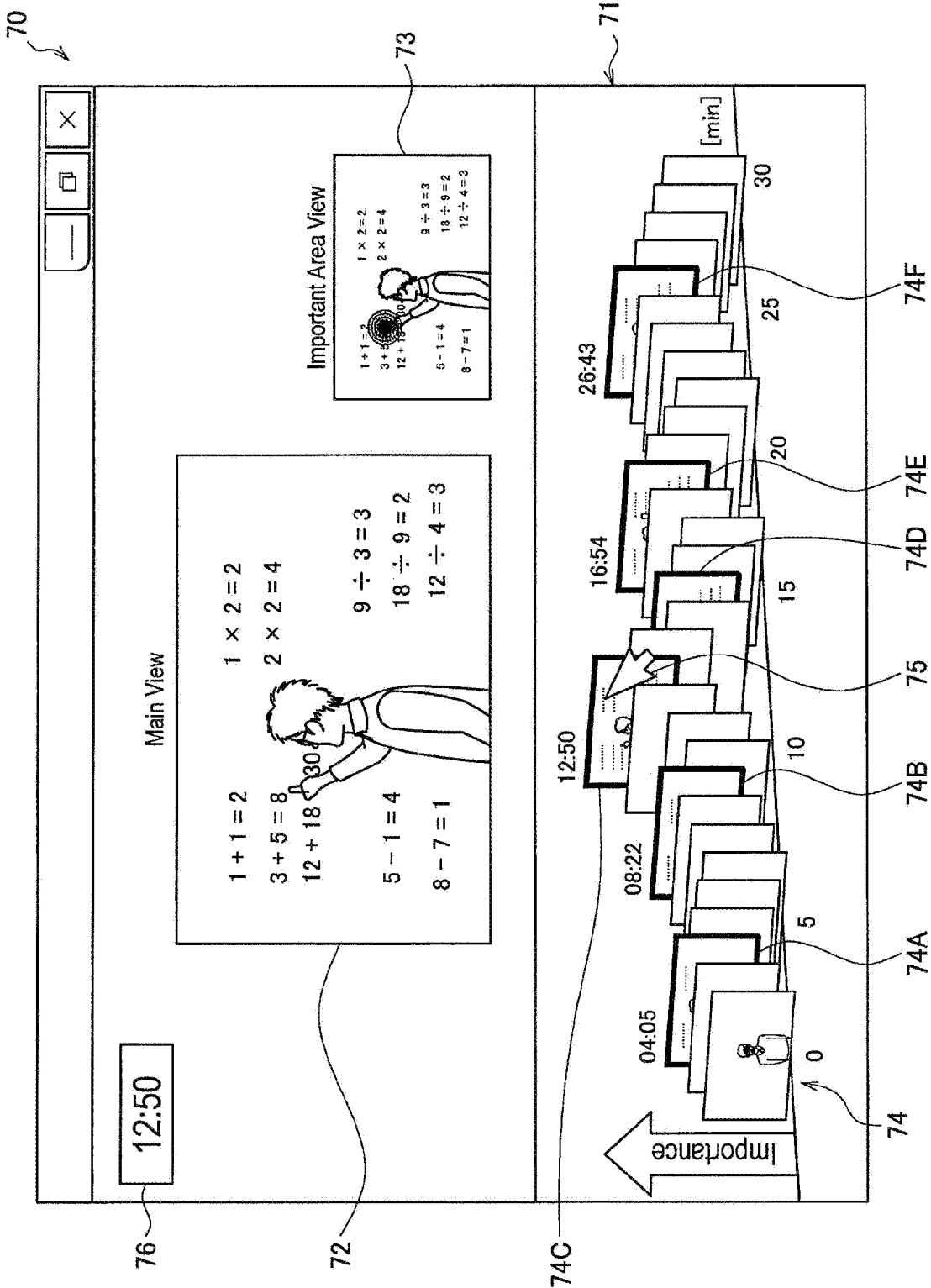
FIG. 13 illustrates an example of the reproduction screen of the lecture moving image according to the present embodiment.

FIG. 13 illustrates an example of the reproduction screen of the lecture moving image according to the present embodiment. The reproduction screen 70 illustrated in FIG. 13 includes a first region 71, a second region 72, and a third region 73. A horizontal axis of the first region 71 means a time axis, and a vertical axis thereof means importance. As illustrated in FIG. 13, in the first region 71, a plurality of importance maps 74 are arranged along a time axis (i.e., horizontal axis), and importance maps 74A to 74F at times when the reproduction indexes are assigned are emphasized. Being arranged along the time axis means being arranged in a predetermined direction from one end toward the other in the order of reproduction in the lecture moving image. The arranging direction is arbitrary from left to right, from right to left, from upper to lower, from lower to upper, etc., and a two or more tier arrangement may also be adopted. In addition, the emphasis means a display that allows for viewer's easy recognition as compared with other superimposed images. In FIG. 13, as an example of the emphasis, frames of the superimposed images are displayed thick, but the emphasis method is not limited to the example illustrated in FIG. 13, and may be emphasized by a color or a change in gray scale, etc. of the superimposed image. In addition, the importance maps 74A to 74F at times when the reproduction indexes are assigned are associated with respective time displays. Such displays enable the viewer to easily visually recognize at which time the highly important content is explained in a scene while continuing to see the importance maps 74 along the time axis, thus improving the convenience. Further, in the first region 71, the plurality of importance maps 74 are arranged along an importance axis (i.e., vertical axis) in accordance with the importance of the important regions included in the importance maps. Being arranged along the importance axis means being arranged in the order of importance (e.g., in a descending order or an ascending order) from one end toward the other in a predetermined direction. The arranging direction is arbitrary from left to right, from right to left, from upper to lower, from lower to upper, etc., and a two or more tier arrangement may also be adopted. Such displays enable the viewer to select a reproduction position while visually recognizing the increase or decrease in the importance in the entire lecture moving image, thus improving the convenience. The selection of any importance map 74 by operating a pointer 75 enables the viewer to reproduce the lecture moving image in the second region 72 from a reproduction position corresponding to the selected importance map 74. It is to be noted that, in addition to the operation of the pointer 75, the importance map 74 may be selected by an operation specific to a touch panel such as a touch operation, a gesture operation, an audio input, an operation from an external device, or the like. In the example illustrated in FIG. 13, an example is illustrated in which the importance map 74C is selected. In the second region 72, the lecture moving image is reproduced from 12 minutes and 50 seconds which is the time of the importance map 74C. In addition, in the third region 73, the importance map at the time point of 12 minutes and 50 seconds is displayed. A time display 76 indicates time of the lecture moving image being reproduced in the second region 72.

Modification Example

In the above description, the description has been given of the example in which the importance map at the time when the reproduction index is assigned is displayed in the first region, but the present technology is not limited to such an example. For example, the reproduction control unit 150 may generate a reproduction screen including, as the first region, an image in which information indicating a plurality of important regions at a plurality of times when the reproduction indexes are assigned is superimposed to an image of the writing surface on which the writing information is written. Here, the writing surface on which the writing information is written means a writing surface on which the writing information is written all the way through (e.g., a writing surface on which the writing information is written all over). The reproduction control unit 150 generates an image of the writing surface on which the writing information is written all the way through by joining and synthesizing background pixels at respective times at which the positions of the lecturer in the lecture moving image differ. Such a reproduction control enables the viewer to check at a glance the content of the writing surface on which the writing information is written and the plurality of important regions on the writing surface.

In a case where information indicating the important region included in the first region is selected by the viewer, the reproduction control unit 150 reproduces the lecture moving image from a reproduction position corresponding to the information indicating the selected important region. The reproduction position corresponding to the information indicating the selected important region means a reproduction position corresponding to the importance map, at the time when the reproduction index is assigned which corresponds to the information indicating the selected important region. The reproduction position corresponding to the importance map is as described above. Such a reproduction control enables the viewer to efficiently view a scene in which each important region is considered to be explained while checking at a glance a plurality of important regions on the writing surface on which the writing information is written.

An example of the reproduction screen in this case is described with reference to FIG. 14.

Figure 14:
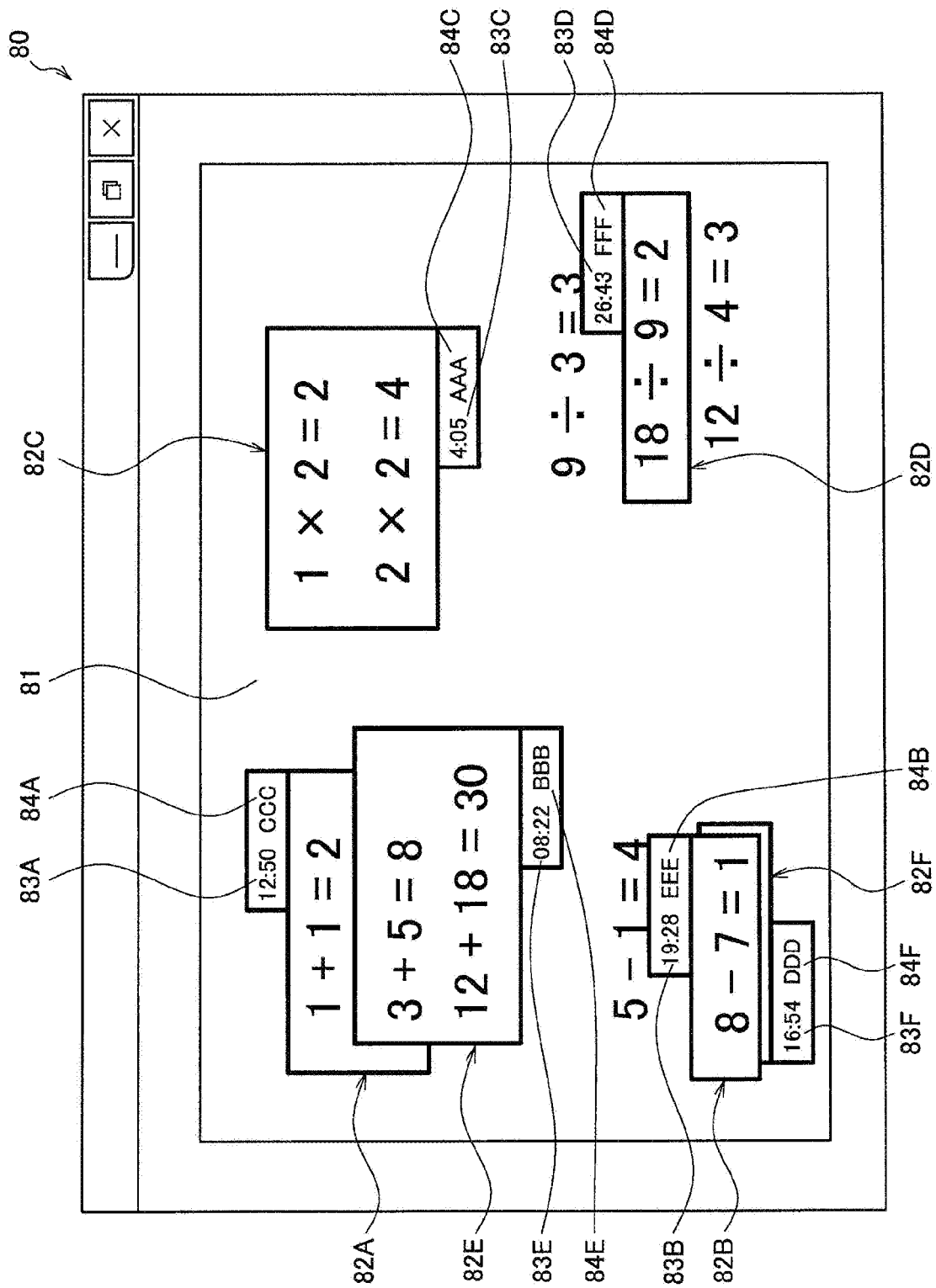
FIG. 14 illustrates an example of the reproduction screen of the lecture moving image according to the present embodiment.

FIG. 14 illustrates an example of a reproduction screen of a lecture moving image according to the present embodiment. In a reproduction screen 80 illustrated in FIG. 14, information 82 (82A to 82F) indicating a plurality of important regions at a plurality of times at which the reproduction indexes are assigned is superimposed on an image 81 on a writing surface on which writing information is written all the way through. In FIG. 14, the information 82 indicating the important region is displayed in rectangle, but may be displayed in any shape, such as an oval shape or a curve along a contour of a character, or may be displayed using a character style in which a character corresponding to the important region is bold or darkened. In addition, the information 82 indicating each important region is associated with time displays 83 (83A to 83F). The time displays 83 indicate the times at which the reproduction indexes corresponding to the respective important regions are assigned. Further, the information 82 indicating the respective important regions is associated with information 84 (84A to 84F) indicating recognition results of the respective important regions. Here, the recognition results mean summarized information such as recognition results of characters included in the important region. Associating these recognition results enables the viewer to easily grasp the content of the important region. Selection of the information 82 indicating any important region (or the time display 83 or the information 84 indicating the recognition results) by operating an unillustrated pointer enables the viewer to reproduce the lecture moving image from a reproduction position corresponding to the information 82 indicating the selected important region. For example, when the information 82A indicating the important region is selected by the viewer, the reproduction control unit 150 reproduces the lecture moving image from a position of 12 minutes and 50 seconds. At that time, a reproduction window may be generated separately for reproducing the lecture moving image.

It is to be noted that, in a case where a plurality of important regions overlap, pieces of the information 82 indicating important regions are displayed in an overlapped manner, and the selection by the viewer using an unillustrated pointer allows for a control over which one is on the foreground. For example, in FIG. 14, pieces of the information 82A and 82E indicating important regions overlap, and pieces of the information 82B and 82F indicating important regions overlap; pieces of the information 82E and 82B indicating the important regions are on the foreground in accordance with operations by the viewer.

(3) Processing Flow

Figure 15:
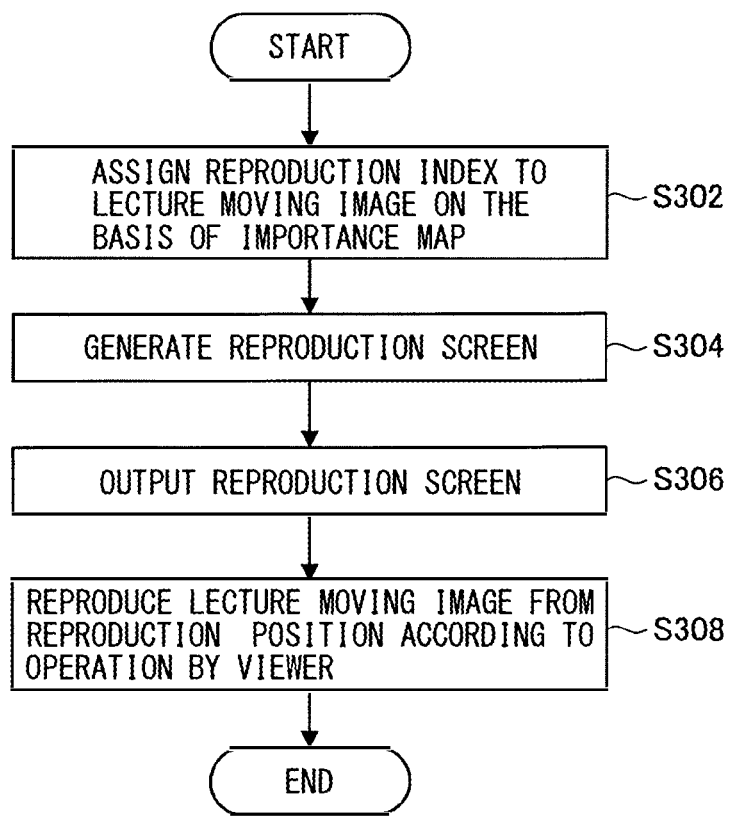
FIG. 15 is a flowchart illustrating an example of a flow of reproduction control processing to be executed by the information processor according to the present embodiment.

Hereinafter, description is given of an example of a flow of a reproduction control processing with reference to FIG. 15. FIG. 15 is a flow chart illustrating an example of a flow of the reproduction control processing to be executed by the information processor 100 according to the present embodiment.

As illustrated in FIG. 15, first, the reproduction control unit 150 assigns a reproduction index to the lecture moving image on the basis of the importance map (step S302). Particularly, the reproduction control unit 150 assigns the reproduction index at each time when the importance of each of the one or more important regions included in the lecture moving image reaches a peak.

The reproduction control unit 150 then generates a reproduction screen, and causes the output apparatus 210 to output the reproduction screen (step S304 and step S30 6). Particularly, the reproduction control unit 150 generates the reproduction screen including at least one of the first region, the second region, or the third region. The reproduction screen is as described above with reference to FIGS. 12 to 14.

Then, the reproduction control unit 150 reproduces the lecture moving image from a reproduction position according to an operation by the viewer inputted via the operation apparatus 220 (step S308). Particularly, the reproduction control unit 150 reproduces the lecture moving image from the reproduction position according to the importance map selected in the first region (the example illustrated in FIG. 12 or FIG. 13) or from the reproduction position according to the information indicating the important region (the example illustrated in FIG. 14).

4. Hardware Configuration Example

Figure 16:
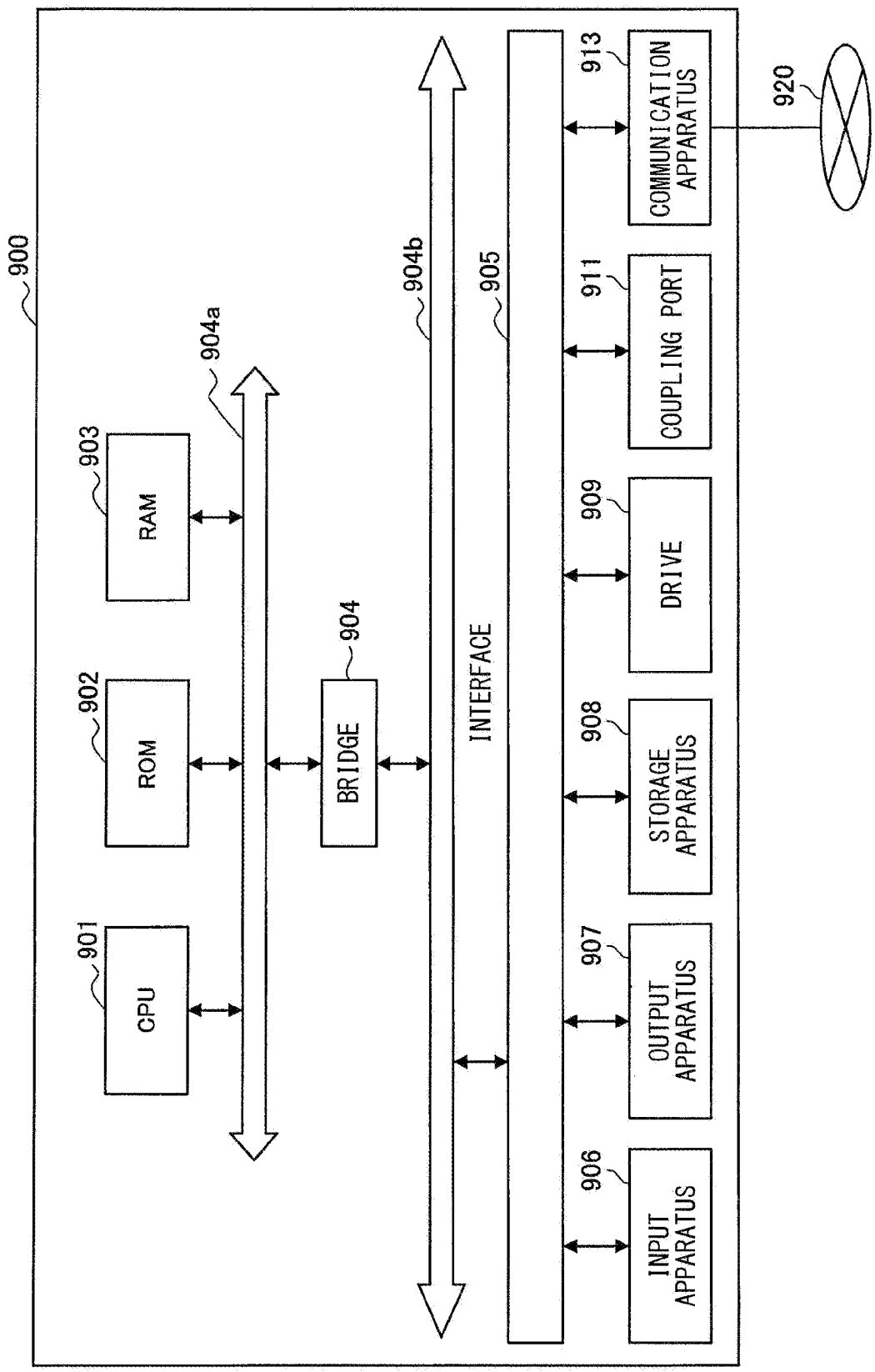
FIG. 16 is a block diagram illustrating an example of a hardware configuration of the information processor according to the present embodiment.

Finally, description is given of a hardware configuration of the information processor according to the present embodiment with reference to FIG. 16. FIG. 16 is a block diagram illustrating an example of the hardware configuration of the information processor according to the present embodiment. It is to be noted that an information processor 900 illustrated in FIG. 16 may implement, for example, the information processor 100 illustrated in FIG. 2. Information processing by the information processor 100 according to the present embodiment is implemented by cooperation between software and hardware described below.

As illustrated in FIG. 16, the information processor 900 includes a CPU (Central Processing Unit) 901, a ROM (Read Only Memory) 902, a RAM (Random Access Memory) 903, and a host bus 904a. In addition, the information processor 900 includes a bridge 904, an external bus 904b, an interface 905, an input apparatus 906, an output apparatus 907, a storage apparatus 908, a drive 909, a coupling port 911, and a communication apparatus 913. The information processor 900 may include, in place of or in addition to the CPU 901, a processing circuit such as an electric circuit, a DSP, or an ASIC.

The CPU 901 functions as an arithmetic processor and a controller, and controls overall operations in the information processor 900 in accordance with various programs. In addition, the CPU 901 may be a microprocessor. The ROM 902 stores programs to be used by the CPU 901, arithmetic parameters, and the like. The RAM 903 temporarily stores programs to be used in execution by the CPU 901, parameters appropriately changed in the execution, and the like. The CPU 901 may form, for example, the acquisition unit 110, the detection unit 120, the generation unit 130, and the reproduction control unit 150 illustrated in FIG. 2. In the present embodiment, the CPU 901 acquires a lecture moving image, detects a pointed position on the basis of the acquired lecture moving image, generates an importance map on the basis of the detected pointed position, generates a reproduction screen on the basis of the generated importance map, and controls reproduction of the lecture moving image.

The CPU 901, the ROM 902 and the RAM 903 are coupled mutually by the host bus 904a including a CPU bus, or the like. The host bus 904a is coupled to the external bus 904b such as a PCI (Peripheral Component Interconnect/Interface) bus via the bridge 904. It is to be noted that it is not necessarily required to configure the host bus 904a, the bridge 904, and the external bus 904b to be separated; these functions may be implemented in one bus.

The input apparatus 906 may be implemented by, for example, an apparatus to which information is inputted by a user, such as a mouse, a keyboard, a touch panel, a button, a microphone, a switch, and a lever. In addition, the input apparatus 906 may be, for example, a remote control apparatus utilizing infrared rays or other radio waves, or may be an externally coupled apparatus such as a mobile phone or a PDA compatible with operations of the information processor 900. Further, the input apparatus 906 may include, for example, an input control circuit that generates an input signal on the basis of information inputted by a user who uses the input means described above and outputs the generated input signal to the CPU 901. By operating this input apparatus 906, the user of the information processor 900 is able to input various data to the information processor 900 or to give an instruction of a processing operation. The input apparatus 906 may form, for example, the operation apparatus 220 illustrated in FIG. 2. That is, the information processor 100 and the operation apparatus 220 may be configured integrally. It is to be noted that, in a case where the input apparatus 906 is configured as a touch panel, the input apparatus 906 may accept an input such as a touch operation, a tap operation, a flick operation, or a swipe operation.

The output apparatus 907 is formed by an apparatus that is able to visually or auditorily notify the user of acquired information. Examples of such an apparatus include a display apparatus such as a CRT display apparatus, a liquid crystal display apparatus, a plasma display apparatus, an EL display apparatus, a laser projector, an LED projector, and a lamp, an audio output apparatus such as a speaker and a headphone, and a printing apparatus, etc. The output apparatus 907 outputs, for example, results obtained by various types of processing performed by the information processor 900. Specifically, the display apparatus visually displays the results obtained by various types of processing performed by the information processor 900 in various forms such as texts, images, tables, graphs, and the like. Meanwhile, the audio output apparatus converts an audio signal including reproduced audio data or acoustic data, etc. into an analog signal, and outputs the converted analog signal auditorily. The output apparatus 907 may form, for example, the output apparatus 210 illustrated in FIG. 2. That is, the information processor 100 and the output apparatus 210 may be formed integrally.

The storage apparatus 908 is an apparatus for storing data formed as an example of a storage unit of the information processor 900. The storage apparatus 908 is implemented by, for example, a magnetic storage unit device such as an HDD, a semiconductor storage device, an optical storage device, a magneto-optical storage device, or the like. The storage apparatus 908 may include a storage medium, a recording device that records data in the storage medium, a reading device that reads the data from the storage medium, a deleting device that deletes the data recorded in the storage medium, and the like. The storage apparatus 908 stores programs to be executed by the CPU 901, various data, various data acquired from the outside, and the like. The storage apparatus 908 may form, for example, the storage unit 140 illustrated in FIG. 2. In the present embodiment, the storage apparatus 908 may store the importance map generated by the generation unit 130.

The drive 909 is a reader/writer for a storage medium, and is built in or externally attached to the information processor 900. The drive 909 reads information recorded in an attached removable storage medium such as a magnetic disk, an optical disk, a magneto-optical disk, or a semiconductor memory, and outputs the read information to the RAM 903. In addition, the drive 909 is also able to write information into the removable storage medium.

The coupling port 911 is an interface to be coupled to an external apparatus, and is a coupling port with an external apparatus that is able to transmit data by, for example, a USB (Universal Serial Bus).

The communication apparatus 913 is, for example, a communication interface formed by a communication device, etc. for coupling to a network 920. The communication apparatus 913 is, for example, a communication card, etc. for wired or wireless LAN (Local Area Network), LTE (Long Term Evolution), Bluetooth (registered trademark), or WUSB (Wireless USB). In addition, the communication apparatus 913 may be a router for optical communication, a router for ADSL (Asymmetric Digital Subscriber Line), a modem for various types of communication, or the like. The communication apparatus 913 is able to transmit and receive signals or the like to and from the Internet or other communication apparatuses in accordance with a predetermined protocol such as TCP/IP, for example. In the present embodiment, the acquisition unit 110 may acquire the lecture moving image from the camera 200 via the communication apparatus 913.

It is to be noted that the network 920 is a wired or wireless transmission path for information transmitted from an apparatus coupled to the network 920. For example, the network 920 may include a public network such as the Internet, a telephone network, a satellite communication network, and various types of LAN (Local Area Network) including Ethernet (registered trademark), WAN (Wide Area Network), and the like. In addition, the network 920 may include a private network such as IP-VPN (Internet Protocol-Virtual Private Network).

The description has been given above of an example of the hardware configuration that makes it possible to implement the functions of the information processor 900 according to the present embodiment. Each of the above-described components may be implemented using general-purpose members, or may be implemented by hardware specialized in the functions of the respective components. Accordingly, it is possible to appropriately change hardware configurations to be utilized in accordance with a technical level at the time of implementing the present embodiment.

It is to be noted that it is possible to create a computer program for implementing each function of the information processor 900 according to the present embodiment as described above and to mount the computer program on a PC, etc. In addition, it is also possible to provide a computer-readable recording medium in which such a computer program is stored. The recording medium is, for example, a magnetic disk, an optical disk, a magneto-optical disk, a flash memory, or the like. In addition, the computer program described above may be distributed via a network, for example, without using a recording medium.

5. Application Example

The technology according to an embodiment of the present disclosure can be applied to a variety of products. For example, the technology according to an embodiment of the present disclosure may be applied to a surgery room system.

Figure 17:
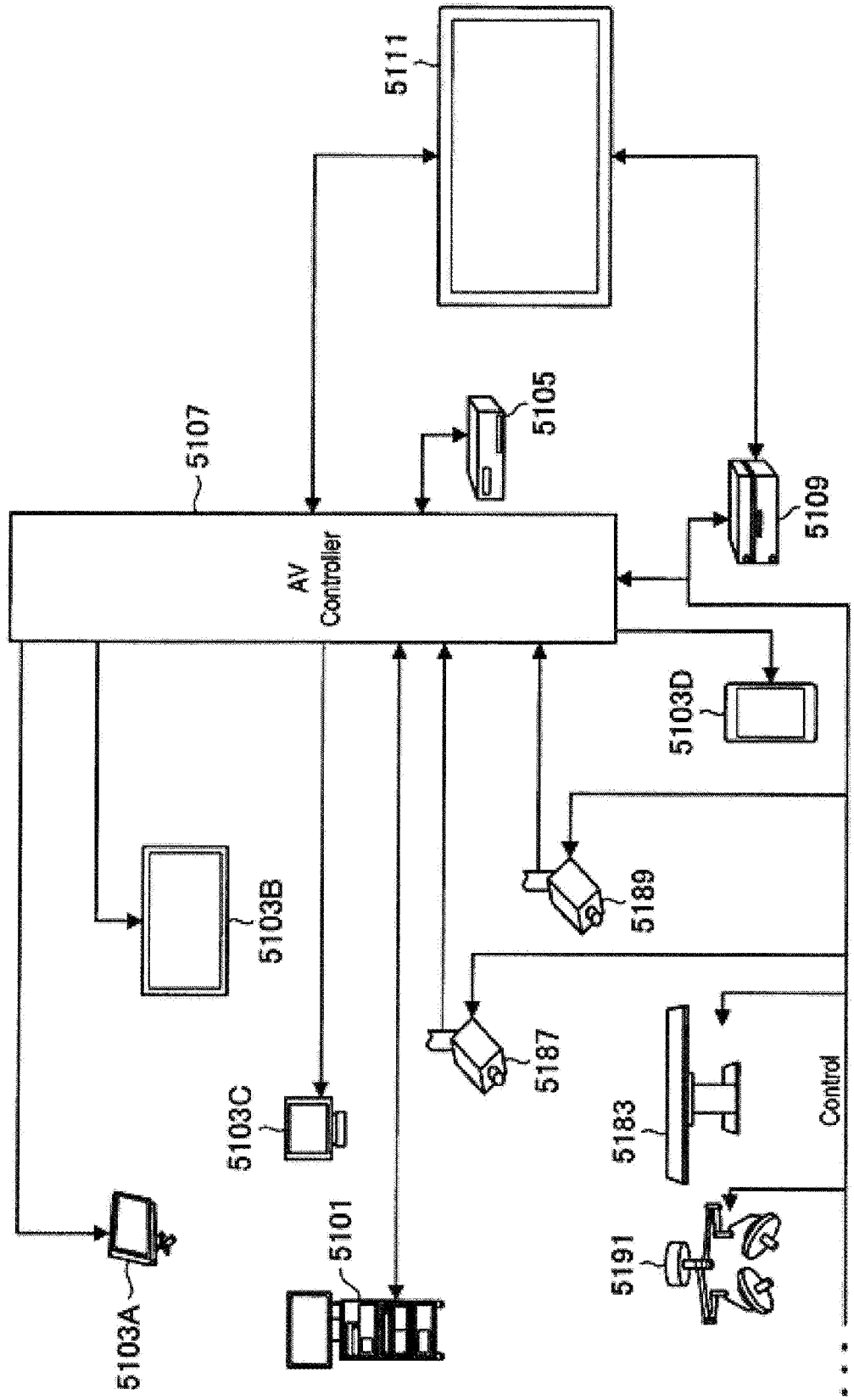
FIG. 17 is a view schematically depicting a general configuration of a surgery room system.

FIG. 17 is a view schematically depicting a general configuration of a surgery room system 5100 to which the technology according to an embodiment of the present disclosure can be applied. Referring to FIG. 17, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 17, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 17, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 18:
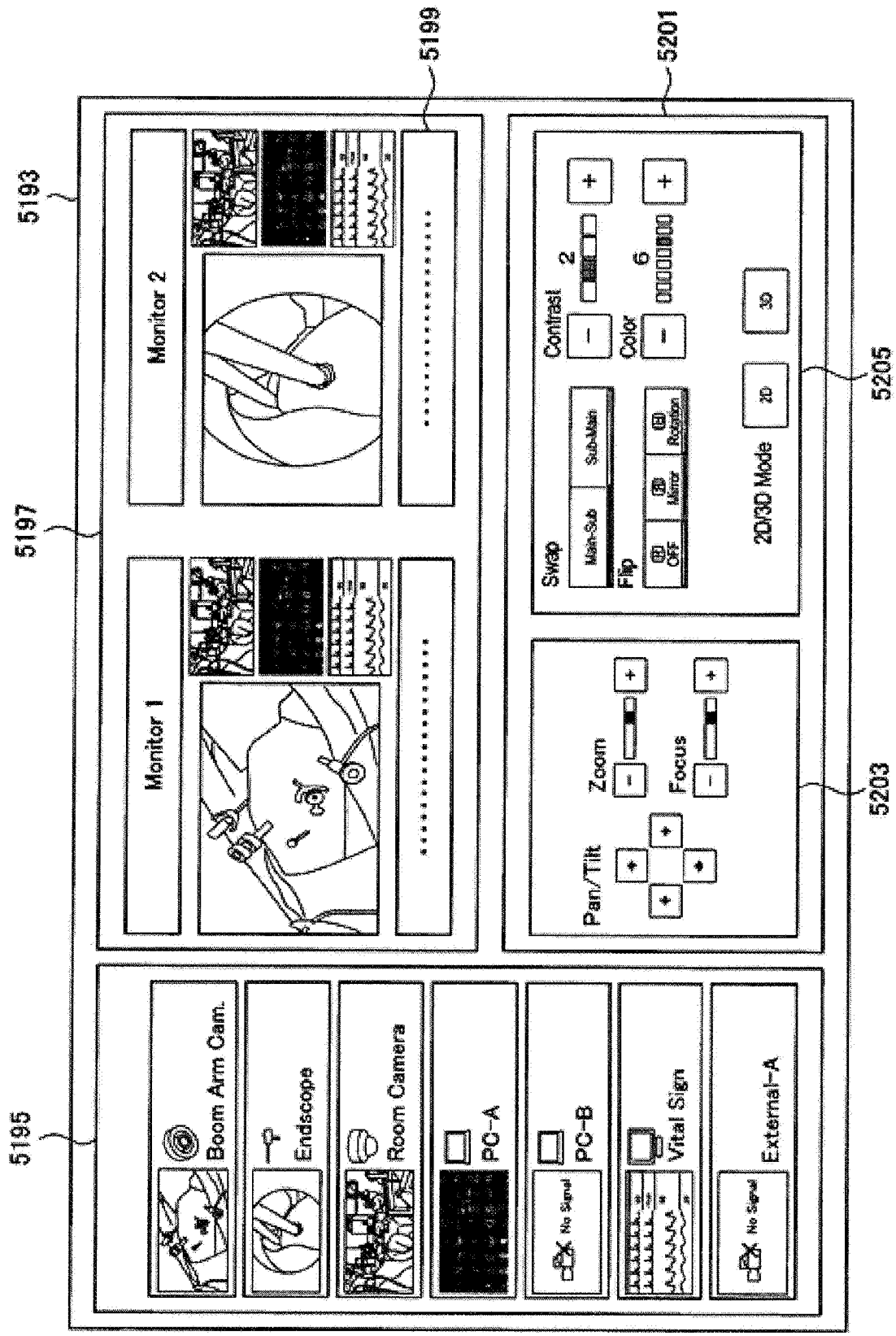
FIG. 18 is a view depicting an example of a display of an operation screen image of a centralized operation panel.

FIG. 18 is a view depicting an example of display of an operation screen image on the centralized operation panel 5111. In FIG. 18, as an example, an operation screen image is depicted which corresponds to a case in which two display apparatus are provided as apparatus of an output destination in the surgery room system 5100. Referring to FIG. 18, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 19:
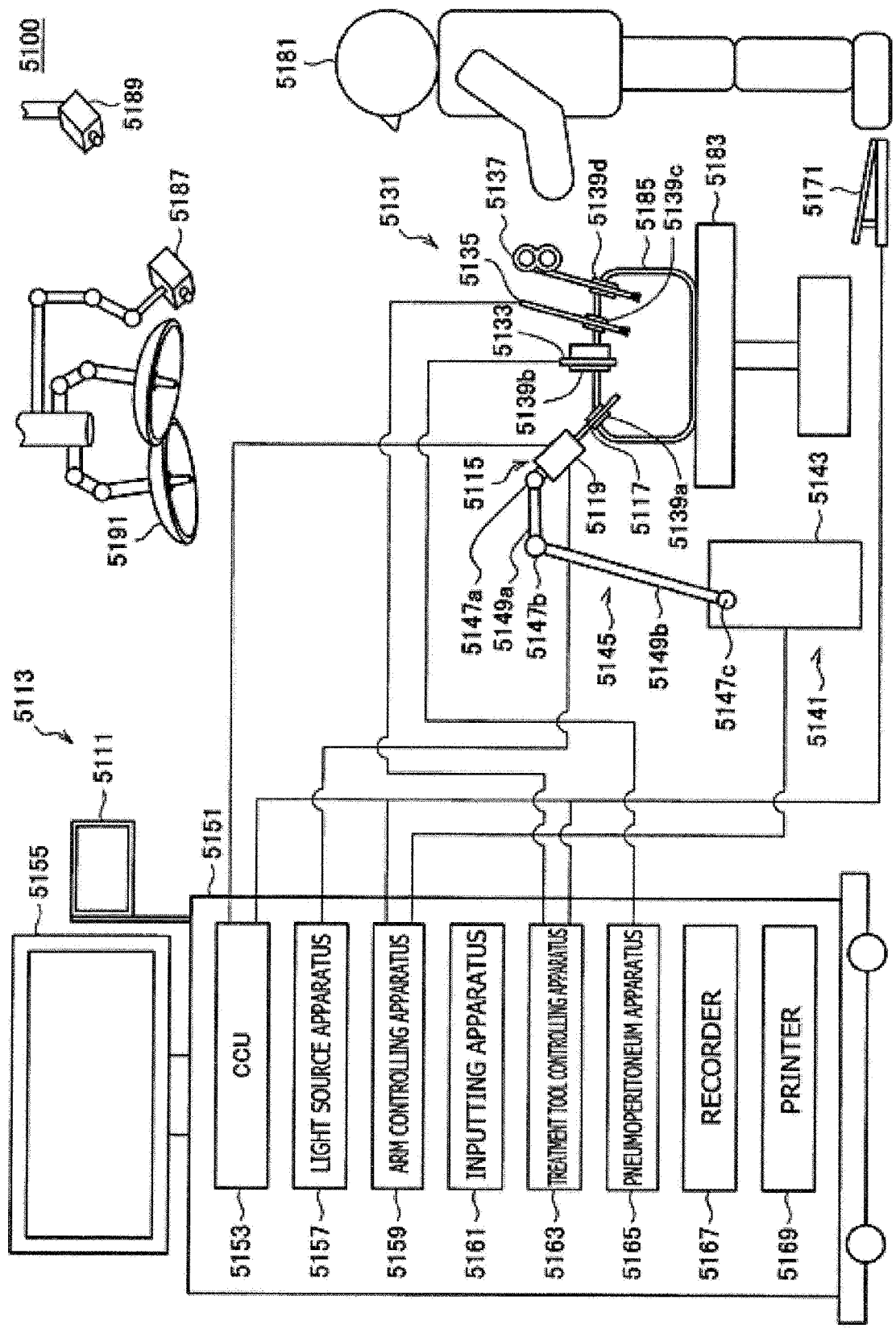
FIG. 19 is a view illustrating an example of a state of surgery to which the surgery room system is applied.

FIG. 19 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates light at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 19) as depicted in FIG. 17. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139*a* to 5139*d* are used to puncture the abdominal wall. Then, a lens barrel 5117 of the endoscope 5115 and the other surgical tools 5131 are inserted into body lumens of the patient 5185 through the trocars 5139*a* to 5139*d*. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147*a*, 5147*b* and 5147*c* and links 5149*a* and 5149*b* and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is irradiated toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 17 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840×vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 19, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are irradiated time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue to irradiate light of a narrower band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 20:
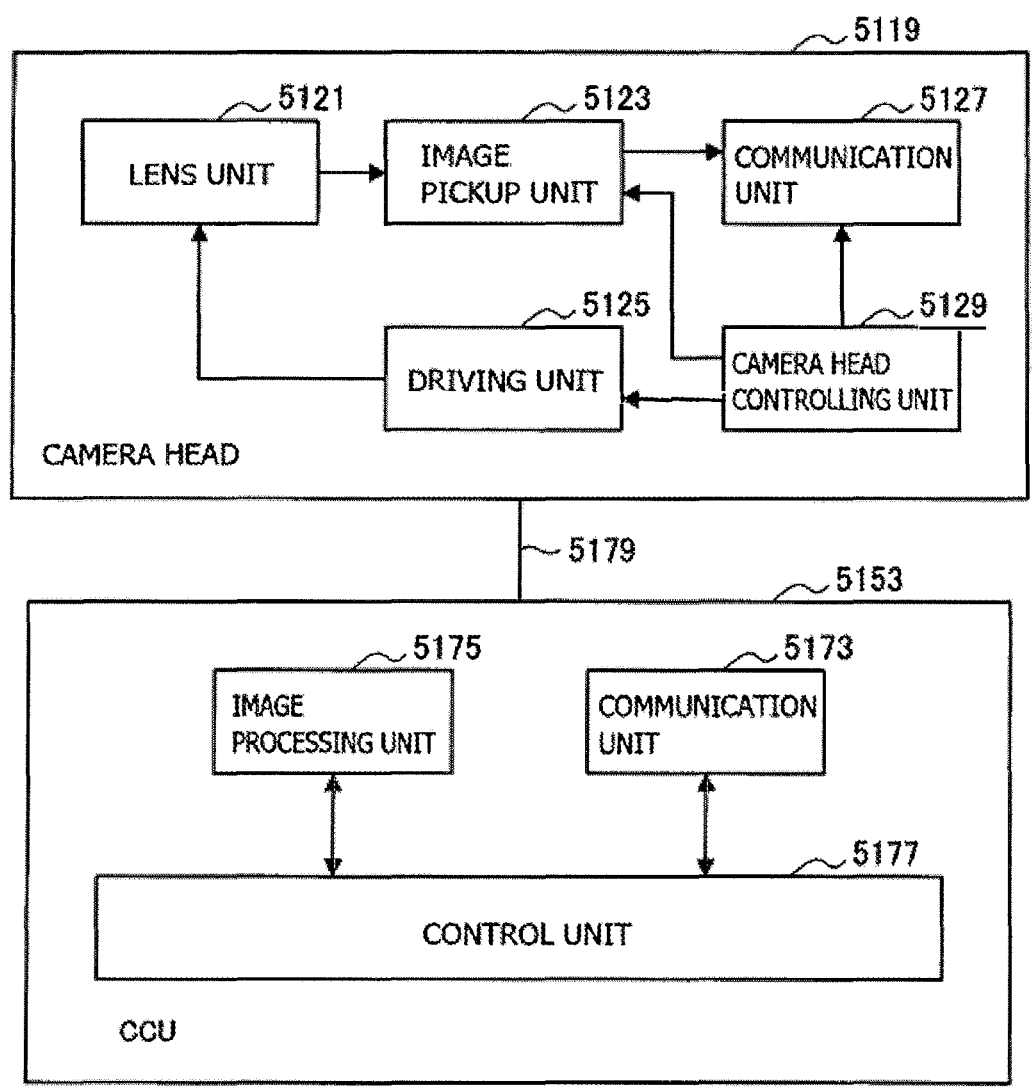
FIG. 20 is a block diagram depicting an example of a functional configuration of a camera head and a camera control unit (CCU) depicted in FIG. 19.

Functions of the camera head 5119 of the endoscope 5115 and the CCU 5153 are described in more detail with reference to FIG. 20. FIG. 20 is a block diagram depicting an example of a functional configuration of the camera head 5119 and the CCU 5153 depicted in FIG. 19.

Referring to FIG. 20, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5001 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display unit 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The technology according to an embodiment of the present disclosure can be suitably applied to, for example, the audiovisual controller 5107, among the above-described configurations. Specifically, the audiovisual controller 5107 may have the functions of the acquisition unit 110, the detection unit 120, the generation unit 130, the storage unit 140, the reproduction control unit 150, and the like described above, and may generate an importance map on the basis of an inputted moving image (image data and audio data), and may output an output image based on the importance map.

In a case where the technology according to an embodiment of the present disclosure is applied to the audiovisual controller 5107, the input image data may be, for example, an image acquired by imaging of a camera such as the ceiling camera 5187, the surgery field camera 5189, and the endoscope 5115, or an image stored in the recorder 5105. For example, the image acquired by the imaging of the surgery field cameras 5189 and the image acquired by the imaging of the endoscopes 5115 may be the input image data. Alternatively, the image acquired by the imaging of the endoscope 5115 and an image acquired by imaging of an unillustrated microscope may be the input image data. Alternatively, the image acquired by the imaging of the surgery field camera 5189 and an image acquired by imaging of an unillustrated line-of-sight camera (wearable camera) worn by the surgeon may be the input image data.

In addition, in a case where the technology according to an embodiment of the present disclosure is applied to audiovisual controllers 5107, the input audio data may be, for example, audio data acquired by the inputting apparatus 5161. Alternatively, an unillustrated audio input device may be provided together in a camera such as the sealing camera 5187, the surgery field camera 5189, or the endoscope 5115, and audio data acquired by the audio input device may be the input audio data.

In a case where the technology according to an embodiment of the present disclosure is applied to the audiovisual controller 5107, the operation target in the physical space means a state of the surgical region, the patient 5185, the affected area, or the surgery room, and the operator means the surgeon 5181 or a medical staff other than the surgeon 5181. In addition, the operation position means a hand tip of the surgeon 5181 or the medical staff other than the surgeon 5181, or a tip, etc. of the surgical tool. For example, the audiovisual controller 5107 accumulates position information of the hand tip on the basis of a moving image of the hand tip of the surgeon 5181 with the surgical region as the background (hereinafter, also referred to as a surgery moving image), and generates the importance map. This enables the audiovisual controller 5107 to specify, as the important region, a site (i.e., an important site for therapy), of the surgery moving image, that has been intensively treated by the surgeon 5181.

In a case where the technology according to an embodiment of the present disclosure is applied to the audiovisual controller 5107, a reproduction screen is created on the basis of the above-described importance map to control the reproduction control. For example, the audiovisual controller 5107 assigns a reproduction index to the surgery moving image on the basis of the importance map. Reproduction of the surgery moving image using the reproduction index enables the viewer to efficiently view the state of the treatment of the site that has been intensively treated by the surgeon 5181. In this case, the viewer means a superior who supervises the surgeon 5181, a family member of the patient 5185, the patient 5185 himself or herself, or a student or an intern who learns surgery using the surgery moving image. In a case where the viewer is the superior who supervises the surgeon 5181, the family member of the patient 5185, or the patient 5185 himself or herself, the surgeon 5181 is able to explain the state of the surgery afterward while efficiently exhibiting the surgery state. In addition, in a case where the viewer is the student or the intern, the viewer can learn while efficiently viewing the student or the intern.

In a case where the technology according to an embodiment of the present disclosure is applied to the audiovisual controllers 5107, the first region of the reproduction screen may be displayed in the sending source operation region 5203, and the second region and the third region may be displayed in the preview region 5197. The viewer operates the sending source operation region 5203 to thereby control the reproduction position of the surgery moving image. Then, in the preview region 5197, the surgery moving image is reproduced from the reproduction position operated in the sending source operation region 5203, and the importance map of the surgery moving image being reproduced is displayed. In this case, the viewer is the surgeon 5181 during surgery or a medical staff other than the surgeon 5181. The surgeon 5181 or the medical staff other than the surgeon 5181 is able to efficiently review the contents of the surgery during surgery, thus making it possible to prevent forgetting to perform treatment and forgetting to remove gauze, etc.

6. Conclusion

The description has been given above in detail of an embodiment of the present disclosure with reference to FIGS. 1 to 20. As described above, the information processor 100 according to the present embodiment recognizes a motion of an operator with respect to an operation target in a moving image, and specifies an important region of the operation target in the moving image on the basis of an operation position of the operator. This makes it possible to efficiently specify, for example, in the lecture moving image, a region which has been explained by the lecturer while pointing and is considered to be important on the writing surface on which the writing information is written. In other words, it is possible to visualize a part, of the writing surface on which the writing information is written, which the lecturer recognizes as important. This enables a student who views the lecture moving image to learn efficiently. In addition, the lecturer's own viewing of the lecture moving image encourages the lecturer to reflect and facilitate better lesson building.

In addition, the information processor 100 assigns a reproduction index to the lecture moving image on the basis of the accumulated value of the pointed position calculated in specifying the important region. This enables the viewer to efficiently view the lecture moving image, such as starting the viewing in order from an important scene, instead of in the order of time axis.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

For example, in the embodiment described above, the examples of the lecture and the surgery have been described as application targets of the present technology, but the present technology is not limited to such examples.

For example, the present technology may be applied to agriculture. In agriculture, the operation target is a farm, and the operator is an agricultural worker. On the basis of a moving image that has captured images of the farm and the agricultural worker working at the farm (hereinafter, also referred to as an agricultural moving image), the information processor 100 specifies an important region of the farm. The important region is specified on the basis of an accumulated value of times operated by the agricultural worker for respective regions of the farm appearing in the agricultural moving image. The position operated by the agricultural worker means a position operated by a hand tip of the agricultural worker or an agricultural tool. For example, a region, of the farm, where the agricultural worker has worked over time is specified as the important region, and the reproduction index is assigned at the time when such a work on the important region is performed. The viewer is, for example, a student who studies agriculture. The student is able to learn while efficiently reproducing a part in which the important work has been performed, using the reproduction index. The viewer may be the agricultural worker himself or herself. The agricultural worker is able to efficiently review his or her own work history using the reproduction index, thus making it possible to efficiently discover, for example, a region where the agricultural worker has planted seeds but forgot to water or a region where the agricultural worker forgot to weed.

In addition, the present technology is applicable to any use case in which a moving image including an operator and an operation target serving as a background of the operator is captured by a fixedly installed camera, in addition to the lecture, the surgery room system, and the agriculture. For example, the present technology is applicable to a monitoring camera, a watch camera in a home, and the like. In addition, the present technology is also applicable to a lecture using presentation materials. In that case, the information processor 100 is able to specify an important region for each single sheet of the presentation materials.

For example, the present technology may be applied to a use case in which a non-fixedly installed camera is used. For example, the present technology may be applied to a so-called life log camera that is worn by a user and records the life of the user, with the position and posture being changed. In this case, the operator means any person appearing in the life log camera, and the operation target is a general background appearing behind the operator. However, in the life log camera, the position and posture of the camera are changed arbitrarily, and thus the operation position appearing in the moving image may be changed even if the position operated by the operator is unchanged. Accordingly, the information processor 100 may estimate the positional relationship between the operator and the operation target while estimating the position and posture of the camera in an environmental map including information indicating the arrangement and shapes, etc. of objects around the camera, thereby specifying an important region in the operation target. At that time, for example, a technique called SLAM (Simultaneous Localization And Mapping) may be used, which is able to simultaneously estimate the position and posture of the camera as well as positions of feature points appearing in images of the camera.

In addition, the processing described herein with reference to flowcharts and sequence diagrams may not necessarily be executed in the illustrated order. Several processing steps may be executed in parallel. Further, an additional processing step may be adopted, and some of the processing steps may be omitted.

In addition, the effects described herein are merely illustrative or exemplary, and are not limitative. That is, the technology according to an embodiment of the present disclosure may achieve, in addition to or in place of the above effects, other effects that are obvious to those skilled in the art from the description of the present specification.

It is to be noted that the technical scope of the present disclosure also includes the following configurations.

(1)

An information processor including a control unit that recognizes a motion of an operator with respect to an operation target in a moving image and specifies an important region of the operation target in the moving image on a basis of an operation position of the operator.

(2)

The information processor according to (1), in which the control unit generates a superimposed image in which information indicating the important region is superimposed on the moving image.

(3)

The information processor according to (2), in which the control unit generates a reproduction screen including a first region in which the superimposed image at a time when a reproduction index is assigned is displayed.

(4)

The information processor according to (3), in which, in the first region,
- a plurality of the superimposed images are arranged in a predetermined direction from one end toward another end in a reproduction order in the moving image, and
- the superimposed image at the time when the reproduction index is assigned is displayed to allow for easy recognition as compared with another of the superimposed images.

(5)

The information processor according to (4), in which, in the first region, the plurality of the superimposed images are arranged in a predetermined direction from one end toward another end in an order of importance of the important region included in the superimposed image.

(6)

The information processor according to any one of (3) to (5), in which the control unit assigns the reproduction index to the moving image in accordance with importance of the important region.

(7)

The information processor according to (6), in which the control unit assigns the reproduction index at a timing that satisfies a predetermined condition between a start and an end of accumulation of respective importances of one or more of the important regions included in the moving image.

(8)

The information processor according to (7), in which the control unit assigns the reproduction index at each of times when the respective importances of the one or more important regions included in the moving image reach a peak.

(9)

The information processor according to any one of (3) to (8), in which the reproduction screen further includes a second region in which the moving image is reproduced, and a third region in which the superimposed image at a time corresponding to a reproduction position of the moving image is displayed.

(10)

The information processor according to (9), in which, in a case where the superimposed image included in the first region is selected by a viewer, the control unit reproduces the moving image from a reproduction position corresponding to the selected superimposed image.

(11)

The information processor according to (10), in which, in the case where the superimposed image included in the first region is selected by the viewer, the control unit reproduces the moving image from a reproduction position in accordance with a temporal change in the important region included in the selected superimposed image.

(12)

The information processor according to (3), in which the reproduction screen includes an image in which information is superimposed on an image of the operation target, the information indicating a plurality of the important regions at a plurality of times when the respective reproduction indexes are assigned.

(13)

The information processor according to (12), in which the information indicating the important regions is associated with information indicating recognition results of the important regions.

(14)

The information processor according to any one of (1) to (13), in which the control unit calculates an accumulated value of a time in which the operation position remains for each region of the operation target appearing in the moving image, and specifies a region of which the accumulated value is large as the important region.

(15)

The information processor according to (14), in which the control unit decreases the accumulated value in accordance with elapse of time.

(16)

The information processor according to (15), in which the control unit starts decreasing the accumulated value in a case where a predetermined change occurs in the operation target appearing in the moving image.

(17)

The information processor according to any one of (1) to (16), in which
- the operation target includes a writing surface on which information is written, and
- the operation position includes a position of a hand tip of the operator or a position pointed by a pointer held by the operator.

(18)

An information processor including a control unit that controls a display of a superimposed image in which information is superimposed on a moving image, the information indicating an important region of an operation target in the moving image, the important region being specified on a basis of an operation position of an operator with respect to the operation target in the moving image.

(19)

An information processing method executed by a processor, the method including:
- recognizing a motion of an operator with respect to an operation target in a moving image; and
- specifying an important region of the operation target in the moving image on a basis of an operation position of the operator.

(20)

A program that causes a computer to function as a control unit that recognizes a motion of an operator with respect to an operation target in a moving image, and specifies an important region of the operation target in the moving image on a basis of an operation position of the operator.

REFERENCE NUMERALS LIST 1 system
2 operation target
3 operator
100 information processor
110 acquisition unit
120 detection unit
130 generation unit
140 storage unit
150 reproduction control unit
200 camera 210 output apparatus
220 operation apparatus

The invention claimed is:

1. An information processing apparatus comprising:
processing circuitry configured to:
determine an important region of an operation target in a moving image on a basis of an operation position of an operator with respect to the operation target in the moving image,
wherein the processing circuitry is further configured to determine the important region by being configured to:
specify the important region based on an accumulated value of a time in which the operation position remains for each region of the operation target appearing in the moving image,
wherein the accumulated value is larger than a predetermined value, and
wherein the processing circuitry is further configured to modify the accumulated value of the time in which the operation position remains for each region of the operation target appearing in the moving image.

2. The information processing apparatus according to claim 1, wherein the processing circuitry is further configured to decrease the accumulated value of the region.

3. The information processing apparatus according to claim 2, wherein the processing circuitry is further configured to decrease the accumulated value in response to the processing circuitry determining that a predetermined change has occurred in the operation target appearing in the moving image.

4. The information processing apparatus according to claim 3, wherein the processing circuitry is further configured to decrease the accumulated value in response to the processing circuitry determining that rewriting or erasure has occurred in the operation target appearing in the moving image.

5. The information processing apparatus according to claim 1, wherein the processing circuitry is further configured to calculate, for each region of the operation target appearing in the moving image, the accumulated value of the time in which the operation position remains.

6. The information processing apparatus according to claim 5, wherein the accumulated value of the time in which the operation position remains is calculated by adding each time period in which the operation position occurs in the moving image.

7. The information processing apparatus according to claim 1, wherein the processing circuitry is further configured to generate a superimposed image indicating the important region and incorporate the superimposed image into the moving image.

8. The information processing apparatus according to claim 1, wherein the operation target is a writing surface.

9. An information processing method comprising:
determining, using processing circuitry, an important region of an operation target in a moving image on a basis of an operation position of an operator with respect to the operation target in the moving image,
wherein the determining further comprises:
specifying the important region based on an accumulated value of a time in which the operation position remains for each region of the operation target appearing in the moving image, the accumulated value being larger than a predetermined value, and
wherein the determining further comprises modifying the accumulated value of the time in which the operation position remains for each region of the operation target appearing in the moving image.

10. The information processing method according to claim 9, wherein the determining further comprises decreasing the accumulated value of the region.

11. The information processing method according to claim 10, wherein the determining further comprises decreasing the accumulated value in response to determining that a predetermined change has occurred in the operation target appearing in the moving image.

12. The information processing method according to claim 11, wherein the determining further comprises decreasing the accumulated value in response to determining that rewriting or erasure has occurred in the operation target appearing in the moving image.

13. The information processing method according to claim 9, further comprising calculating, for each region of the operation target appearing in the moving image, the accumulated value of the time in which the operation position remains.

14. The information processing method according to claim 13, wherein the accumulated value of the time in which the operation position remains is calculated by adding each time period in which the operation position occurs in the moving image.

15. A non-transitory computer readable medium having stored thereon a program that when executed by a computer causes the computer to implement an information processing method comprising:
determining, using processing circuitry, an important region of an operation target in a moving image on a basis of an operation position of an operator with respect to the operation target in the moving image,
wherein the determining further comprises:
specifying the important region based on an accumulated value of a time in which the operation position remains for each region of the operation target appearing in the moving image, the accumulated value being larger than a predetermined value, and
wherein the determining further comprises modifying the accumulated value of the time in which the operation position remains for each region of the operation target appearing in the moving image.

16. The non-transitory computer readable medium according to claim 15, wherein the determining further comprises decreasing the accumulated value of the region.

17. The non-transitory computer readable medium according to claim 16, wherein the determining further comprises decreasing the accumulated value in response to determining that a predetermined change has occurred in the operation target appearing in the moving image.

18. The non-transitory computer readable medium according to claim 16, wherein the determining further comprises decreasing the accumulated value in response to determining that rewriting or erasure has occurred in the operation target appearing in the moving image.

19. The non-transitory computer readable medium according to claim 15, wherein the method further comprises calculating, for each region of the operation target appearing in the moving image, the accumulated value of the time in which the operation position remains.

20. The non-transitory computer readable medium according to claim 19, wherein the accumulated value of the time in which the operation position remains is calculated by adding each time period in which the operation position occurs in the moving image.

* * * * *